United States Patent
Sun et al.

(10) Patent No.: US 11,846,785 B1
(45) Date of Patent: Dec. 19, 2023

(54) DIFFRACTION OPTICAL WAVEGUIDE AND GRATING STRUCTURE THEREOF, AND DISPLAY DEVICE

(71) Applicant: JIAXING UPHOTON OPTOELECTRONICS TECHNOLOGY CO., LTD., Tongxiang (CN)

(72) Inventors: Guofang Sun, Tongxiang (CN); Peng Chen, Tongxiang (CN); Lei Sui, Tongxiang (CN); Kehan Tian, Tongxiang (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 18/350,694

(22) Filed: Jul. 11, 2023

(30) Foreign Application Priority Data

Nov. 4, 2022 (CN) .......................... 202211375272.0

(51) Int. Cl.
  *G02B 27/42* (2006.01)
  *F21V 8/00* (2006.01)
  *G02B 27/01* (2006.01)

(52) U.S. Cl.
  CPC ....... *G02B 27/4227* (2013.01); *G02B 6/0016* (2013.01); *G02B 27/0172* (2013.01)

(58) Field of Classification Search
  CPC .............. G02B 27/4227; G02B 6/0016; G02B 27/0172; G02B 26/0808; G02B 26/10; G02B 26/106; G02B 26/123

USPC ........................................................ 359/204.5
See application file for complete search history.

(56) References Cited

U.S. PATENT DOCUMENTS

| 8,666,208 B1 * | 3/2014 | Amirparviz | .............. G02B 6/10 |
| | | | 385/47 |
| 2021/0116645 A1 | 4/2021 | Kojima et al. | |

FOREIGN PATENT DOCUMENTS

| CN | 111065941 A | 4/2020 |
| CN | 111492302 A | 8/2020 |
| CN | 114994825 A | 9/2022 |
| CN | 115185029 A | 10/2022 |

* cited by examiner

*Primary Examiner* — James C. Jones
*Assistant Examiner* — Henry Duong
(74) *Attorney, Agent, or Firm* — HAUPTMAN HAM, LLP

(57) ABSTRACT

A diffraction optical waveguide, a grating structure, and a display device are disclosed. An arrangement period of a grating line of the grating structure is T and the grating line has a cross-sectional profile with a narrow top and a wide bottom. The cross-sectional profile includes five feature points, which respectively have coordinates (0, 0), (L2, H2), (L3, H3), (L4, H4), (L5, 0), and satisfy: $0.2T \leq L2 < L3 < L4 \leq L5 \leq T$; $L3 \leq 0.8T$; $L3-L2 \geq 0.1T$; $L4 \geq 0.8T$; $0 \leq H2 \leq \lambda$; $0.2\lambda \leq H3 \leq \lambda$; $0.6\lambda \leq H4 \leq 1.8\lambda$; $\max(H2, H3) \leq H4$; $-0.6\lambda \leq H3-H2 \leq 0.6\lambda$, $0.6\lambda \leq H3+H2 \leq 1.8\lambda$; $0.5\lambda/T \leq H3/L3 \leq 2\lambda/T$, where $\lambda$ is a wavelength. According to an embodiment of the present disclosure, the cross-sectional profile can be adjusted by controlling parameters of the feature points, the optical effect is improved and degrees of freedom in design and regulation are increased.

12 Claims, 12 Drawing Sheets

DIFFRACTION OPTICAL WAVEGUIDE AND GRATING STRUCTURE THEREOF, AND DISPLAY DEVICE

TECHNICAL FIELD

The present disclosure refers to diffraction-based display technology, in particular to a diffraction optical waveguide for display, a grating structure, and a display device having the diffraction optical waveguide.

BACKGROUND

With the development of science and technology, AR (Augmented Reality) technology, as a very intelligent and portable display technology, gradually becomes more and more popular. A diffraction optical waveguide is currently a mainstream solution for realizing AR display, in which a waveguide grating is arranged on a waveguide substrate, the waveguide grating including a coupling-in grating and a coupling-out grating. The coupling-in grating couples incident light carrying image information into the waveguide substrate. The coupling-out grating propagates and expands the light carrying image information, and at the same time couples the light out of the waveguide substrate to form a coupled-out light field. The eye receives the light of the coupled-out light field, and thus, for example, an image carried by the incident light can be observed.

However, the image display based on the diffraction optical waveguide has problems of insufficient brightness and deviation of uniformity. The coupling-in grating structure used for the diffraction optical waveguide has a significant effect on this. There are usually two types of grating structures, i.e. a rectangular grating and a blazed grating, used in coupling-in gratings in an existing diffraction optical waveguide. An optical coupling efficiency of the rectangular grating is generally low, and a uniformity of an obtained optical field is poor within a range of a field of view. An optical coupling efficiency and a uniformity of the blazed grating can be greatly improved compared with the rectangular grating, but it is still not enough to solve the problems of image display based on diffraction optical waveguide. In particular, there is a limit on the optical coupling efficiency of the blazed grating. In addition, an existing design scheme of a waveguide grating, especially a coupling-in grating, has many disadvantages, such as a low degree of freedom, a low diffraction efficiency, difficulties in controlling diffraction uniformity as well as in designing and processing products.

SUMMARY

The object of the present disclosure is to provide a diffraction optical waveguide, a grating structure, and a display device with the diffraction optical waveguide, so as to at least partly overcome the deficiencies in the prior art.

According to one aspect of the present disclosure, a diffraction optical waveguide for display is provided, including a waveguide substrate and a coupling-in grating arranged on the waveguide substrate, the coupling-in grating, being configured to couple a light beam into the waveguide substrate, enabling the light beam to propagate within the waveguide substrate through total internal reflection, includes a grating structure, the grating structure including a plurality of grating lines arranged in a plane, and the plurality of grating lines being arranged with a period of T along a first direction in the plane and extending along a second direction perpendicular to the first direction, wherein, each of at least part of the plurality of grating lines has a cross-sectional profile with a narrow top and a wide bottom in a cross section perpendicular to the second direction, the cross-sectional profile including five feature points being in sequentially along the first direction, which are a first feature point, a second feature point, a third feature point, a fourth feature point, and a fifth feature point, and the feature points are the points where maximum curvatures of the cross-sectional profile are located; and in a coordinate system with the first feature point as an origin, the first direction as a first coordinate axis L, and a direction perpendicular to the plane as a second coordinate axis H, the first feature point, the second feature point, the third feature point, the fourth feature point, and the fifth feature point respectively have coordinates (0, 0), (L2, H2), (L3, H3), (L4, H4) and (L5, 0), and satisfy following relationships:

$0.2T \le L2 \le L3 \le L4 \le L5 \le T;$ $L3 \le 0.8T; L3-L2 \ge 0.1T; L4 \ge 0.8T;$ $0 \le H2 \le \lambda; 0.2\lambda; H3 \le 0.6\lambda; H4 \le 1.8\lambda;$ $\max(H2, H3) \le H4;$ $-0.6\lambda; H3-H2 \le 0.6\lambda; 0.6\lambda; H3+H2 \le 1.8\lambda;$ and $0.5\lambda/T \le H3/L3 \le 2\lambda/T;$ where $\lambda$ is a working wavelength of the grating structure.

Preferably, the grating structure also satisfies following relationships:

$L4 \ge 0.9T;$ $0.2\lambda; H2 \le 0.8\lambda; H3 \le 0.8\lambda; \lambda \le H4 \le 1.6\lambda;$ $-0.4\lambda; H3-H2 \le 0.4\lambda; 0.8\lambda \le H3+H2 1.6\lambda;$ and $H3/L3 \le 1.5)/T.$ Advantageously, the grating structure also satisfies following relationships:

$H3 \le 0.8\lambda;$ $H3-H2 \le 0.4\lambda; H3+H2 \le 1.4\lambda;$ and $H3/L3 \le \lambda/T.$ In some embodiments, the cross-sectional profile includes at least a curve which is formed between two adjacent feature points among the first feature point, the second feature point, the third feature point, the fourth feature point, and the fifth feature point.

In some embodiments, the cross-sectional profile includes at least a straight line which is formed between two adjacent feature points among the first feature point, the second feature point, the third feature point, the fourth feature point, and the fifth feature point.

In some embodiments, the diffraction optical waveguide further includes a coupling-out grating arranged on the waveguide substrate, wherein the coupling-out grating is configured to couple at least a portion of light within the waveguide substrate propagating thereinto through total internal reflection substantially along a coupling-in direction out of the waveguide substrate by diffraction, the first direction being substantially consistent with the coupling-in direction.

According to another aspect of the present disclosure, a grating structure for the diffraction optical waveguide as described above is provided, including a plurality of grating lines arranged in a plane, the plurality of grating lines being arranged with a period of T along a first direction in the plane and extending along a second direction perpendicular to the first direction, wherein, each of at least a portion of the plurality of grating lines has a cross-sectional profile with a narrow top and a wide bottom in a cross-section perpendicular to the second direction, and the cross-sectional profile includes 5 feature points being sequentially along the first direction, which are a first feature point, a second feature point, a third feature point, a fourth feature point, and a fifth feature point, the feature points are the points where the maximum curvature of the cross-sectional profile is located;

in a coordinate system with the first feature point as an origin, the first direction as a first coordinate axis L, and the direction perpendicular to the plane as a second coordinate axis H, the first feature point, the second feature point, the third feature point, the fourth feature point, and the fifth feature point respectively have coordinates (0, 0), (L2, H2), (L3, H3), (L4, H4) and (L5, 0), and satisfy the following relationships;

$0.2T \leq L2 \leq L3 \leq L4 \leq L5 \leq T;$ $L3 \leq 0.8T; L3-L2 \geq 0.1T; L4 \geq 0.8T;$ $0 \leq H2 \leq \lambda; 0.2\lambda \leq H3 \leq \lambda; 0.6\lambda \leq H4 \leq 1.8\lambda;$ $\max(H2,H3) \leq H4;$ $-0.6\lambda \leq H3-H2 \leq 0.6\lambda; 0.6\lambda \leq H3+H2 \leq 1.8\lambda;$ and $0.5\lambda/T \leq H3/L3 \leq 2\lambda/T;$ where $\lambda$ is the working wavelength of the grating structure.

According to yet another aspect of the present disclosure, a display device is provided, including the diffraction optical waveguide.

Advantageously, the display device is a near-eye display device and includes a lens and a frame for holding the lens close to the eye, the lens including the diffraction optical waveguide.

Advantageously, the display device is an augmented reality display device or a virtual reality display device.

According to the embodiment of the present disclosure, the cross-sectional profile of the grating line of the grating structure includes five feature points. By controlling parameters of these feature points, the cross-sectional profile can be adjusted, thereby significantly improving the optical effect (including coupling-in comprehensive efficiency and uniformity) that the grating structure can achieve, and at the same time increasing degrees of freedom of grating design and optical effect regulation.

BRIEF DESCRIPTION OF THE DRAWINGS

Other features, objects, and advantages of the present disclosure will become more apparent by reading the following detailed description of non-limitative embodiments with reference to the following drawings.

DETAILED DESCRIPTION

Figure 1:
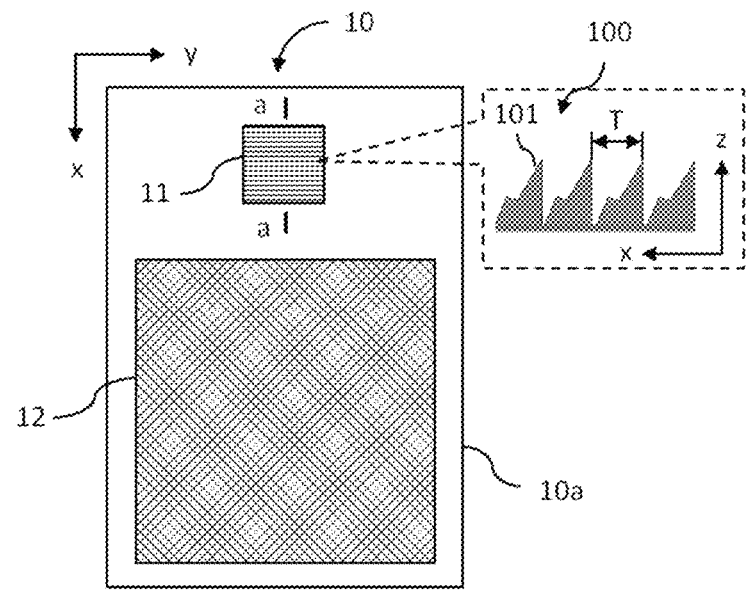
FIG. 1 is a schematic diagram of a diffraction optical waveguide for display according to an embodiment of the present disclosure.

The present disclosure will be further described in detail in conjunction with drawings and embodiments. It should be understood that the specific embodiments described herein are only used to explain the related disclosure, but not to limit the disclosure. For the convenience of description, only the parts related to the disclosure are shown in the drawings. It should be noted that the embodiments in the present application and the features of the embodiments may be combined with each other without conflict.

A problem of low light utilization efficiency and insufficient brightness of a diffraction optical waveguide used for image display has always been concerned. However, in an exploration process, people pay more attention to how to improve a utilization efficiency of light energy that has been coupled into the waveguide through diffraction of a coupled-in grating, while the exploration and research on a new structure of the coupled-in grating itself are still insufficient.

According to embodiments of the present disclosure, a novel grating structure and a diffraction optical waveguide using the grating structure as a coupling-in grating are proposed.

FIG. 1 is a schematic diagram of a diffraction optical waveguide for display according to an embodiment of the present disclosure. As shown in FIG. 1, a diffraction optical waveguide 10 includes a waveguide substrate 10a and a coupling-in grating 11 arranged on the waveguide substrate 10a, the coupling-in grating 11 includes a novel grating structure 100 according to the embodiment of the present disclosure, configured to couple a light beam into the waveguide substrate 10a to propagate therewithin through total internal reflection.

A dashed box in FIG. 1 shows a cross-sectional view of the coupling-in grating 11 taken along a section line a-a. As shown in FIG. 1, the grating structure 100 includes a plurality of grating lines 101 arranged in an x-y plane, the plurality of grating lines are arranged with a period of T along an x direction in the x-y plane and extend along a y direction perpendicular to the x-direction; each of the plurality of grating lines has a cross-section profile with a narrow top and a wide bottom profile in a cross section perpendicular to the y direction.

The diffraction optical waveguide 10 further includes a coupling-out grating 12 arranged on the waveguide substrate 10a, the coupling-out grating 12 is configured to couple at least a portion of the light within the waveguide substrate 10a propagating thereinto through total internal reflection substantially along a coupling-in direction out of the waveguide substrate 10a by diffraction, the coupling-in direction being substantially consistent with the x direction.

Figure 2:
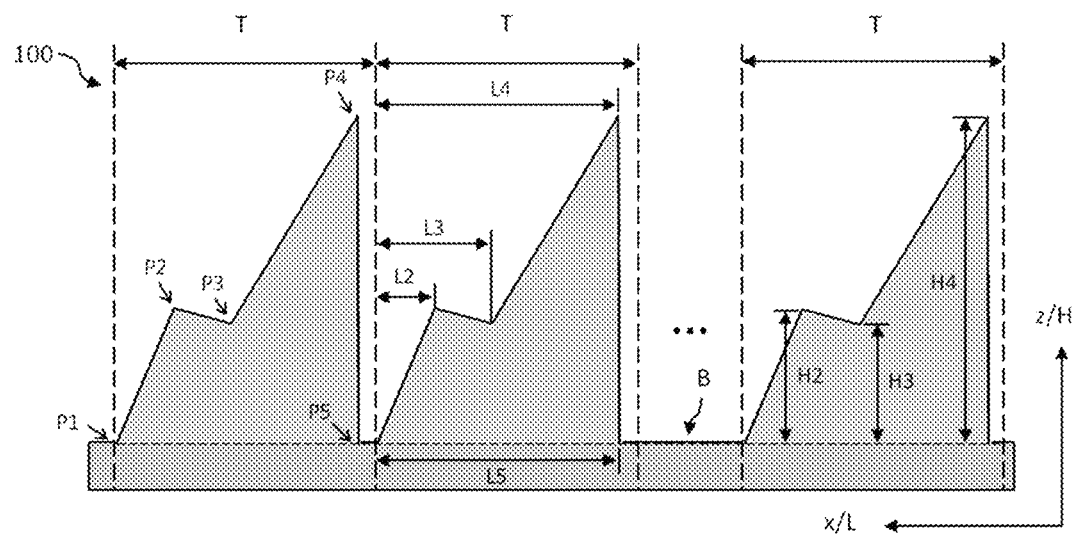
FIG. 2 is a schematic diagram of a cross section of a grating structure according to an embodiment of the present disclosure.

FIG. 2 shows a cross section of the grating structure 100 according to an embodiment of the present disclosure in an enlarged schematic view. As shown more clearly in FIG. 2, a cross-sectional profile of the grating line 101 includes five feature points being sequentially along the x direction, that is, the first feature point P1, the second feature point P2, the third feature point P3, the fourth feature point P4, and the fifth feature point P5.

In this application, "feature point" refers to the point where a maximum curvature of the cross-sectional profile is located, which includes an intersection point between a straight line and a straight line or a straight line and a curve that are not tangent to each other. Such an intersection point is considered in this application as the point where the maximum curvature is infinite.

In addition, the above-mentioned first feature point P1 and the fifth feature point P5 are the points where the grating line 101 intersects with a reference plane B of the grating structure 100. Generally, the reference plane B can be, for example, a surface of the waveguide substrate 10a; in other cases, the reference plane B can also be another plane constructed or processed on the surface of the waveguide substrate 10a, which can protrude above the surface of the waveguide substrate 10a or sunk thereinto.

As shown in FIG. 2, in a coordinate system with the first feature point P1 as an origin, the x direction as a horizontal coordinate axis L, and a z direction perpendicular to the x-y plane as a height coordinate axis H, and the first feature point P1, the second feature point P2, the third feature point P3, the fourth feature point P4, and the fifth feature point P5 respectively have coordinates (L1, H1), (L2, H2), (L3, H3), (L4, H4), and (L5, H5), and L1=0, H1=0, H5=0. It should be understood that, due to existence of processing errors, the height H1 of the first feature point P1 and the height H5 of the fifth feature point P5 may have very small values, such as ranging from a few nanometers to about twenty nanometers, which has little effect on the overall cross-sectional profile of the grating line. In addition, it can be understood that a fifth feature point P5 of a grating line may coincide with a first feature point P1 of an adjacent grating line at a same point; in this case, it is still reasonable to mark them as different feature points in the cross-sectional profiles of different grating lines.

According to the embodiment of the present disclosure, in order to obtain a better optical effect, the cross-sectional profile of the grating structure 100 also satisfies a following parameter condition (1):

$$0.2T \leq L2 \leq L3 \leq L4 \leq L5 \leq T;$$

$$L3 \leq 0.8T; L3-L2 \geq 0.1T; L4 \geq 0.8T;$$

$$0 \leq H2 \leq \lambda; 0.2\lambda \leq H3 \leq \lambda; 0.6\lambda \leq H4 \leq 1.8\lambda;$$

$$\max(H2,H3) \leq H4;$$

$$-0.6\lambda \leq H3-H2 \leq 0.6\lambda; 0.6\lambda \leq H3+H2 \leq 1.8\lambda; \text{ and}$$

$$0.5\lambda/T \leq H3/L3 \leq 2\lambda/T;$$

where λ is a working wavelength of the grating structure.

In the present disclosure, an optimization of the grating structure is carried out by investigating an overall optical effect including a coupling-in efficiency and a uniformity when the grating structure is used as a coupling-in grating, so as to select and obtain the grating structure satisfying the above parameter condition (1). Here, the coupling-in efficiency can be calculated by a commonly-used method in the art to calculate the effective efficiency of light propagating from the coupling-in grating into the waveguide, including but not limited to using a coupling-in comprehensive efficiency for calculation, wherein "coupling-in comprehensive efficiency" refers to a ratio of light energy transmitted from the coupling-in grating to the coupling-out grating to that incident on the coupling-in grating by taking into account a coupling effect among various modes of the coupling-in grating and the waveguide substrate. "Uniformity" refers to a distribution uniformity of a diffraction efficiency of different field of view angles within a range of the field of view angle FOVX. The field of view angle FOVX refers to an angle formed by the light incident on the coupling-in grating 11 relative to a normal line of the x-y plane in a direction around the y-axis.

In order to comprehensively evaluate quality of the optical effect of the grating structure 100, a comprehensive optical effect index (fitness=$\text{eff}_{com-ave}-0.35\times\text{uni}$) is constructed here, wherein $\text{eff}_{com-ave}$ is an average value index of coupling-in comprehensive efficiency (hereinafter referred to as "average efficiency"), that is, an average value of the coupling-in comprehensive efficiency within the range of the field of view angle FOVX of the coupling-in grating, and its ideal maximum value is 1, and the larger the value, the higher the diffraction efficiency; and uni is the non-uniformity index, wherein uni=(max−min)/(max+min), max is a maximum diffraction efficiency within the range of the field of view angle FOVX, and min is a minimum diffraction efficiency within the range of the field of view angle FOVX, an ideal optimal value of uni is 0, and the smaller the value, the better the uniformity. It should be noted that the construction of the index fitness in this application is only to more intuitively reflect the technical effect achieved by the grating structure 100 in terms of diffraction efficiency and uniformity, and an evaluation index, as a tool, does not constitute a limitation to outstanding advantages of the grating structure of the present application in terms of optical effect.

The grating structure 100 according to the embodiment of the present disclosure that satisfies the above parameter condition (1) is beneficial to increase a value of the optical effect index fitness to above 0.2 (a primary optical effect target) when used as the coupling-in grating of the diffraction optical waveguide; and as will be introduced in conjunction with the following, under a condition of further optimizing selected parameters, the value of the index fitness can be increased to above 0.225 (a secondary optical effect target). As a comparison, when a rectangular grating is used as the coupling-in grating, the optical effect index fitness is below 0.15. When the grating structure according to the embodiment of the present disclosure is used as the coupling-in grating, not only the above-mentioned good comprehensive optical effect can be obtained, but also it is possible to obtain an excellent average value of the coupling-in comprehensive efficiency exceeding a limit value of the average value of a coupling-in comprehensive efficiency of a blazed grating.

In order to illustrate technical effects achieved by the grating structure 100 according to the embodiment of the present disclosure in terms of diffraction efficiency and uniformity, a scanning calculation example based on the grating structure 100 shown in FIG. 2 will be introduced below.

In calculation examples given below, a wavelength of light is 532 nm, a radius of the coupling-in grating is 2 mm, a grating period is 400 nm, a radius of a coupling-in light beam irradiating on the coupling-in grating is 1.6 mm, the field of view angle FOVY is ranging from −5° to 5°. A change of FOVY has little effect on the efficiency, and the field of view angle FOVX is ranging from −16° to 8°, and refractive indices of the waveguide substrate and a material of the grating structure are both 1.92.

(Scanning Calculation Examples)

In the scanning calculation examples, it is assumed that, the first to fifth feature points in the cross-sectional profile of the grating line of the grating structure 100 are sequentially connected by a straight line, the preset parameter L5=T, and through scanning a parameter L2 with a step size of 0.1T within a range from 0.2T to 0.7T, scanning a parameter L3 with a step size of 0.1T within a range from 0.3T to 0.8T, scanning a parameter L4 with a step size of 0.1T within a range from 0.5T to T, scanning parameters H2 and H3 with a step size of 0.2, within a range from 0 to 1.6λ, scanning a parameter H4 with a step size of 0.2λ within a range from 0.4, to 1.8λ, various grating structures with different cross-sectional profiles are obtained, and through a simulation calculation based on a vector theory or a scalar theory of light propagation, an average value index $\text{eff}_{com-ave}$ of the coupling-in comprehensive efficiency and a non-uniformity index uni are obtained, thereby calculating the value of the optical effect index fitness.

In the above scanning calculation examples, considering L2<0.2T, L3>0.8T, L3-L2<0.1T, H4>1.8λ, and H2 or H3 exceeding H4, there are practical problems such as a high processing difficulty, and parameters within these ranges have not been scanned.

The various results calculated in the scanning calculation examples are statistically analyzed and plotted as different diagrams, which are shown in FIG. 3, FIG. 5, FIG. 7, FIG. 9, FIG. 11, FIG. 13, and FIG. 15, respectively. In these diagrams, each black dot represents a cross-sectional profile/grating structure with corresponding abscissa and ordinate values of the point in the diagram, with a parameter combination that has been scanned in the scanning calculation example and is different from other black dots. In these diagrams, a maximum value of the fitness value on the ordinate reached by the black dot corresponding to a certain abscissa value represents the optimal optical effect that may be achieved through optimization under the condition of the parameter value of the abscissa.

Figure 3:
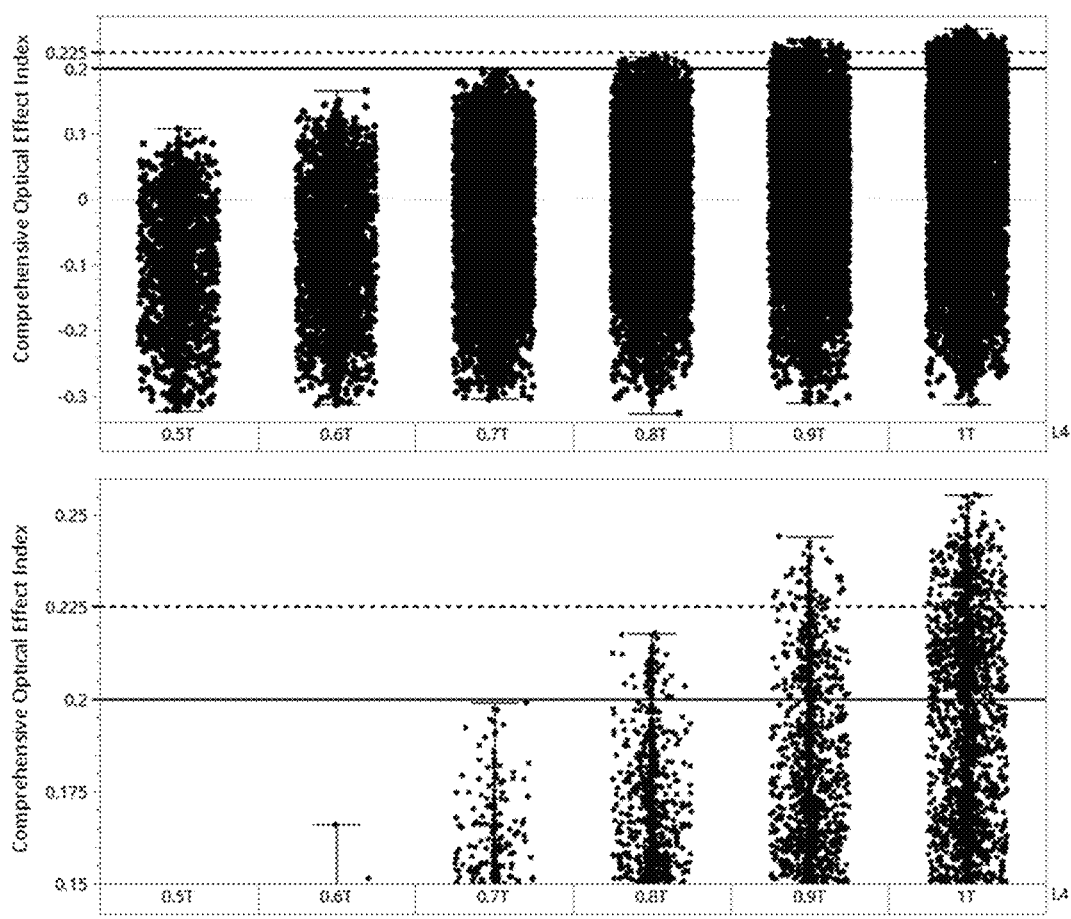
FIG. 3 is a diagram of optical effect indices changing with parameters L4 obtained based on simulation of the grating structure shown in FIG. 2.
Figure 4:
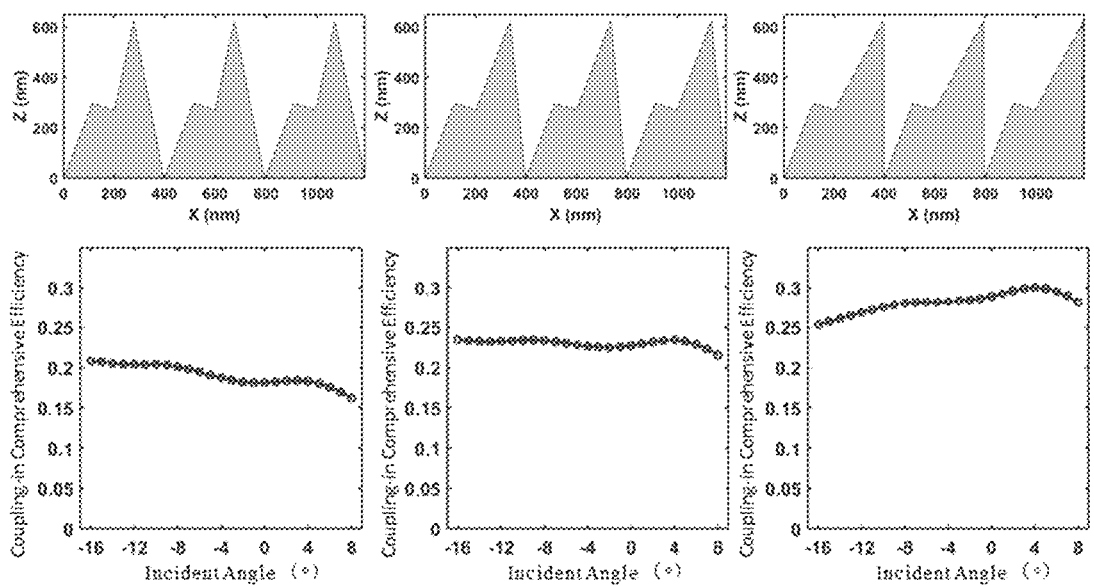
FIG. 4 shows a first group of examples of grating structures and curves of coupling-in comprehensive efficiencies changing with incident angles when they are used as coupling-in gratings in diffraction optical waveguides, wherein the grating structures have different parameters L4.

FIG. 3 is a diagram of the optical effect indices of different grating structures in the scanning calculation examples changing with the parameters L4. As shown in FIG. 3, in the grating structure 100 according to the embodiment of the present disclosure, in order to achieve the primary optical effect target fitness=0.2, advantageously L4≥0.8T, and in order to achieve the secondary optical effect target fitness=0.225, advantageous for L4≥0.9T. In order to intuitively understand the influence of parameter L4 on optical effect, FIG. 4 shows a first group of examples of grating structures and curves of coupling-in comprehensive efficiencies changing with incident angles when they are used as coupling-in gratings in diffraction optical waveguides, wherein the grating structures have different parameters L4.

In FIG. 4 and FIGS. 6, 8, 10, 12, 14, and 16 introduced below, left figures show examples of poor optical effects that do not meet the primary and secondary optical effect targets proposed in the present application (corresponding to examples "left" in Tables 1.1 to 1.14 below), middle figures show examples of meeting the primary optical effect target (corresponding to examples "middle" in Tables 1.1 to 1.14 below), and right figures shows examples of meeting the secondary optical effect target (corresponding to examples "right" in Tables 1.1 to 1.14 below). The above examples "middle" and "right" are examples of grating structures according to the embodiments of the present disclosure.

Figure 5:
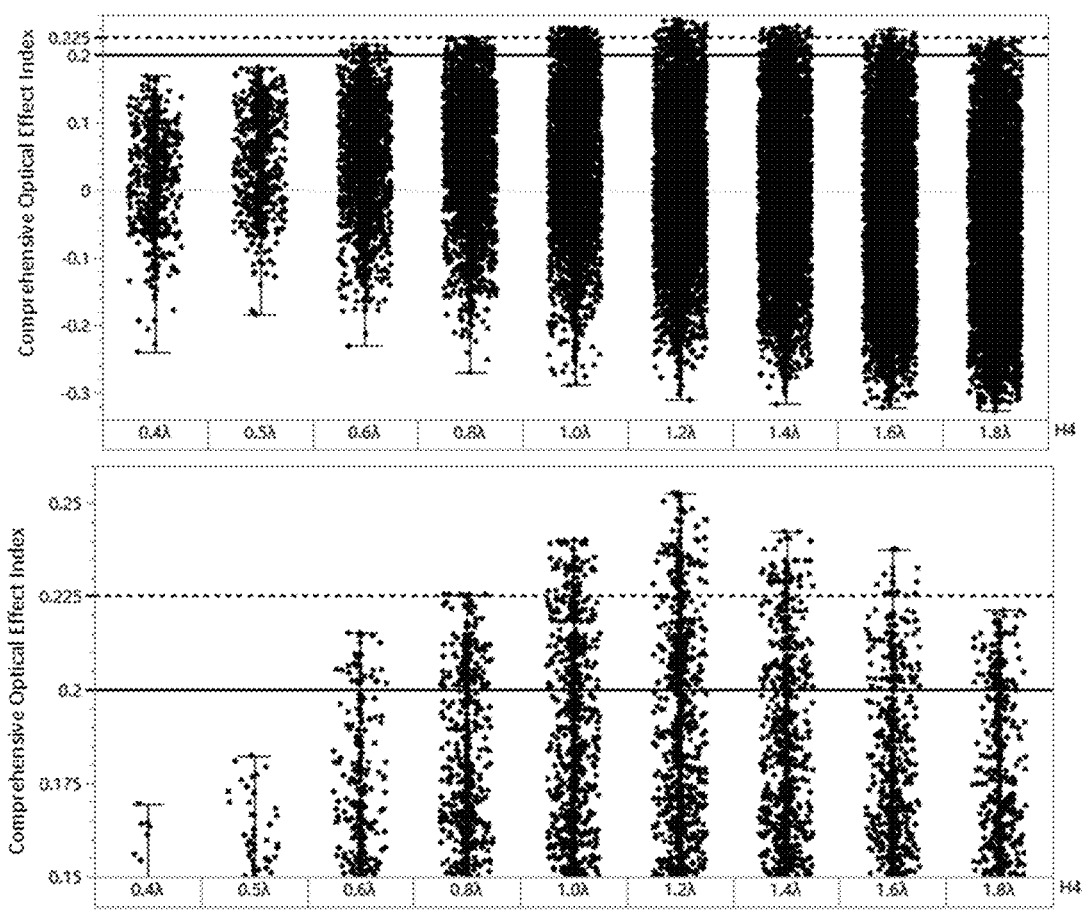
FIG. 5 is a diagram of optical effect indices changing with parameters H4 obtained based on the simulation of the grating structure shown in FIG. 2.
Figure 6:
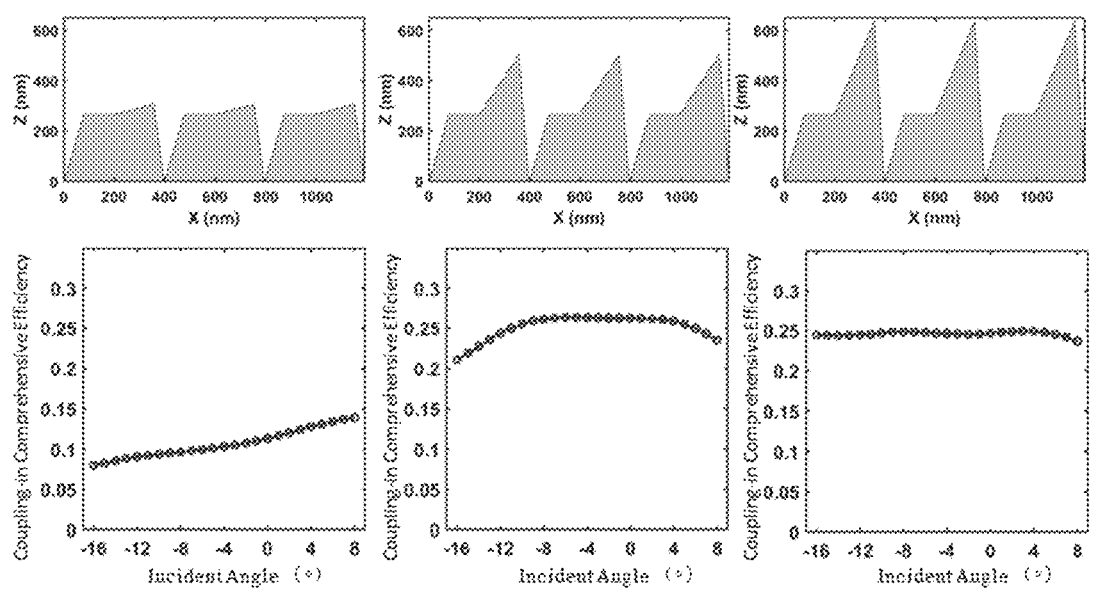
FIG. 6 shows a second group of examples of grating structures and curves of coupling-in comprehensive efficiencies changing with incident angles when they are used as coupling-in gratings in diffraction optical waveguides, wherein the grating structures have different parameters H4.

FIG. 5 is a diagram of the optical effect indices of different grating structures in the scanning calculation examples changing with the parameters H4. As shown in FIG. 5, in the grating structure 100 according to the embodiment of the present disclosure, in order to achieve the primary optical effect target fitness=0.2, advantageously $0.6\lambda \le H4 \le 1.8$, and in order to achieve the secondary optical effect target fitness=0.225, advantageous for $\lambda \le H4 \le 1.6$. In order to intuitively understand the influence of parameter H4 on the optical effect, FIG. 6 shows a second group of examples of grating structures and curves of coupling-in comprehensive efficiencies changing with incident angles when they are used as coupling-in gratings in diffraction optical waveguides, wherein the grating structures have different parameters H4.

Figure 7:
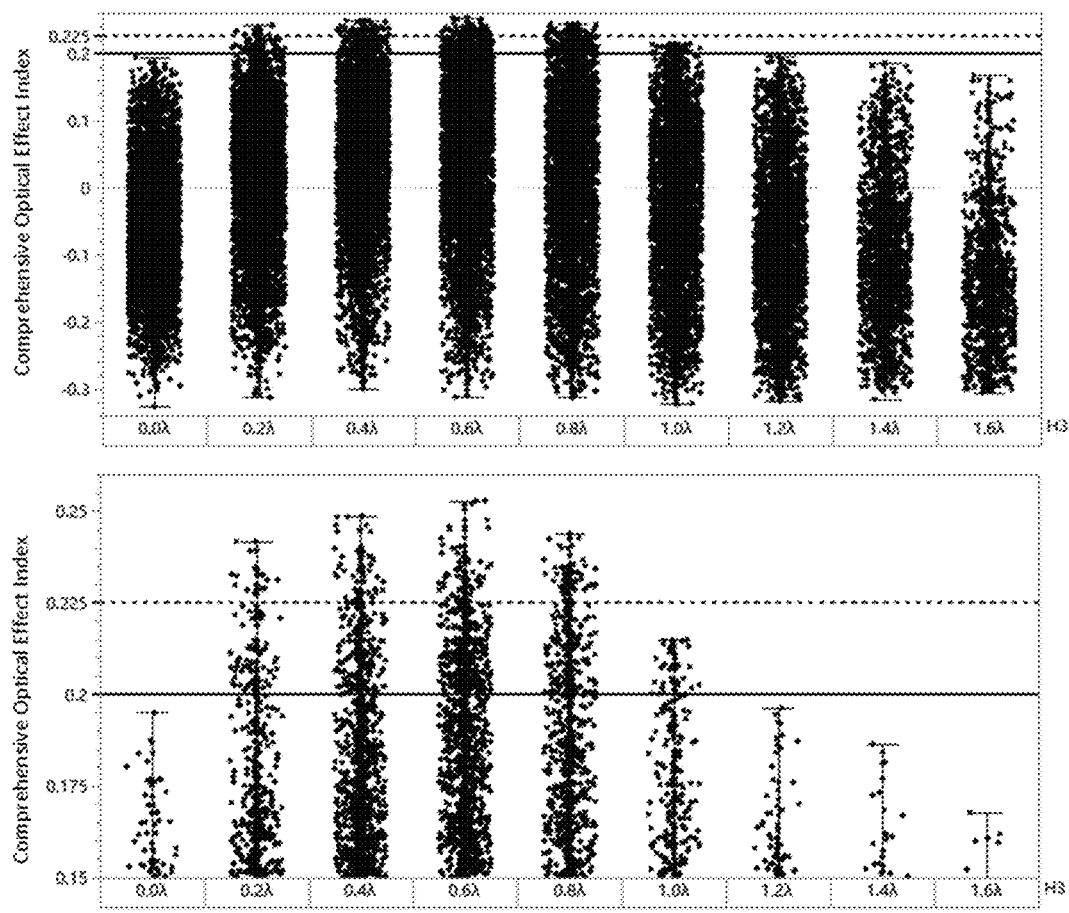
FIG. 7 is a diagram of optical effect indices changing with parameters H3 obtained based on the simulation of the grating structure shown in FIG. 2.
Figure 8:
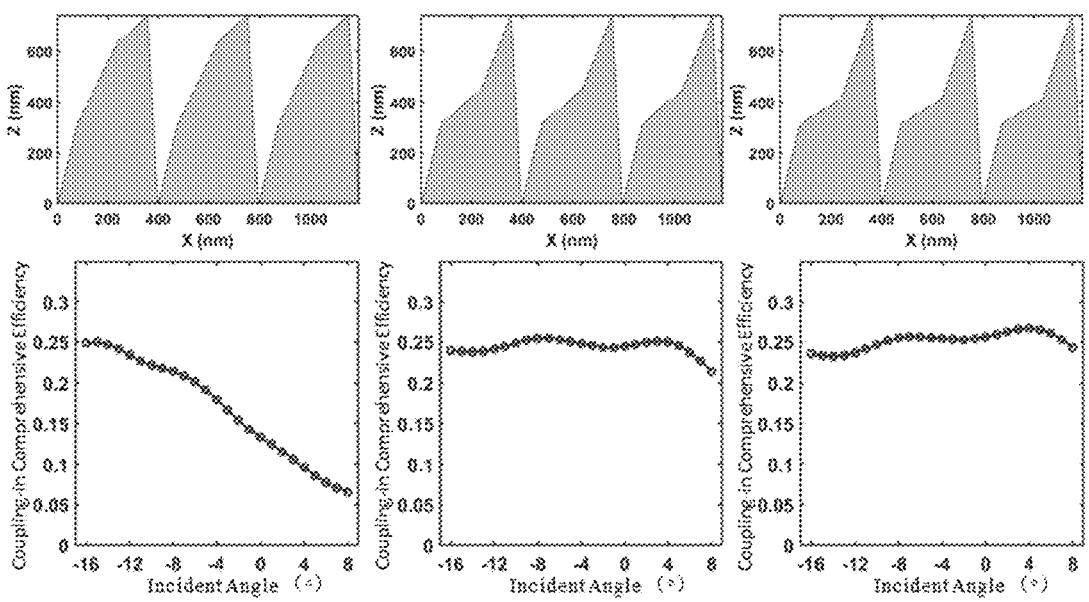
FIG. 8 shows a third group of examples of grating structures and curves of coupling-in comprehensive efficiencies changing with incident angles when they are used as coupling-in gratings in diffraction optical waveguides, wherein the grating structures have different parameters H3.

FIG. 7 is a diagram of the optical effect indices of different grating structures in the scanning calculation examples changing with the parameters H3. As shown in FIG. 7, in the grating structure 100 according to the embodiment of the present invention, in order to achieve the primary optical effect target fitness=0.2, advantageously $0.2\lambda \le H3 \le \lambda$, and in order to achieve the secondary optical effect target fitness=0.225, advantageous for $0.2 \le H3 \le 0.8\lambda$. In order to intuitively understand the influence of parameter H3 on optical effect, FIG. 8 shows a third group of examples of grating structures and curves of coupling-in comprehensive efficiencies changing with incident angles when they are used as coupling-in gratings in diffraction optical waveguides, wherein the grating structures have different parameters H3.

Figure 9:
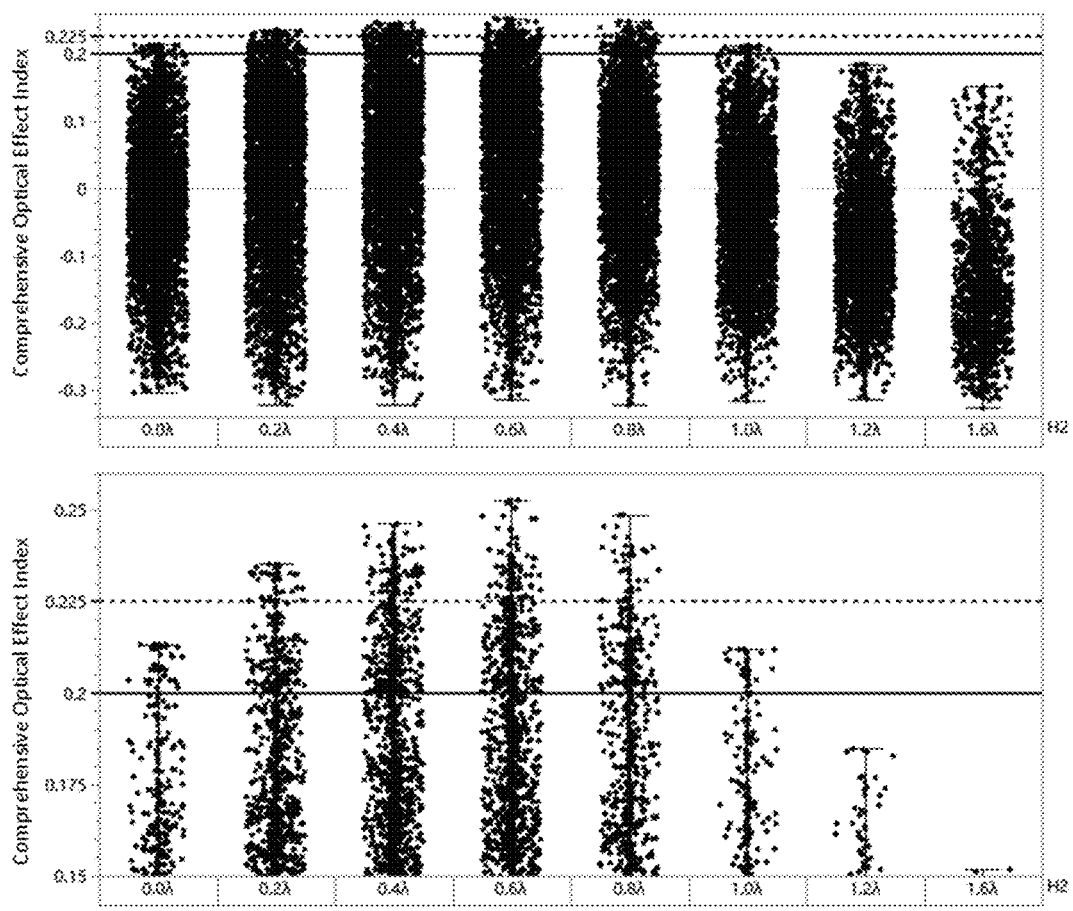
FIG. 9 is a diagram of optical effect indices changing with parameters H2 obtained based on the simulation of the grating structure shown in FIG. 2.
Figure 10:
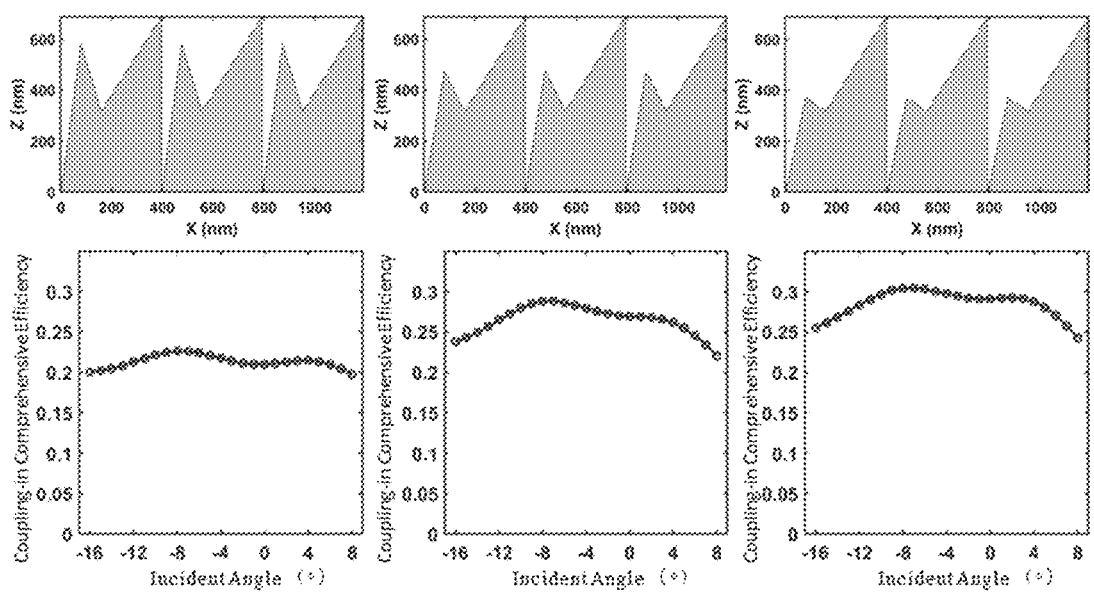
FIG. 10 shows a fourth group of examples of grating structures and curves of coupling-in comprehensive efficiencies changing with incident angles when they are used as coupling-in gratings in diffraction optical waveguides, wherein the grating structures have different parameters H2.

FIG. 9 is a diagram of the optical effect indices of different grating structures in the scanning calculation examples changing with the parameters H2. As shown in FIG. 9, in the grating structure 100 according to the embodiment of the present invention, in order to achieve the primary optical effect target fitness=0.2, advantageously $0 \le H2 \le \lambda$, and in order to achieve the secondary optical effect target fitness=0.225, advantageous for $0.2\lambda \le H2 \le 0.8\lambda$. In order to intuitively understand the influence of parameter H2 on the optical effect, FIG. 10 shows a fourth group of examples of grating structures and curves of coupling-in comprehensive efficiencies changing with incident angles when they are used as coupling-in gratings in diffraction optical waveguides, wherein the grating structures have different parameters H2.

Figure 11:
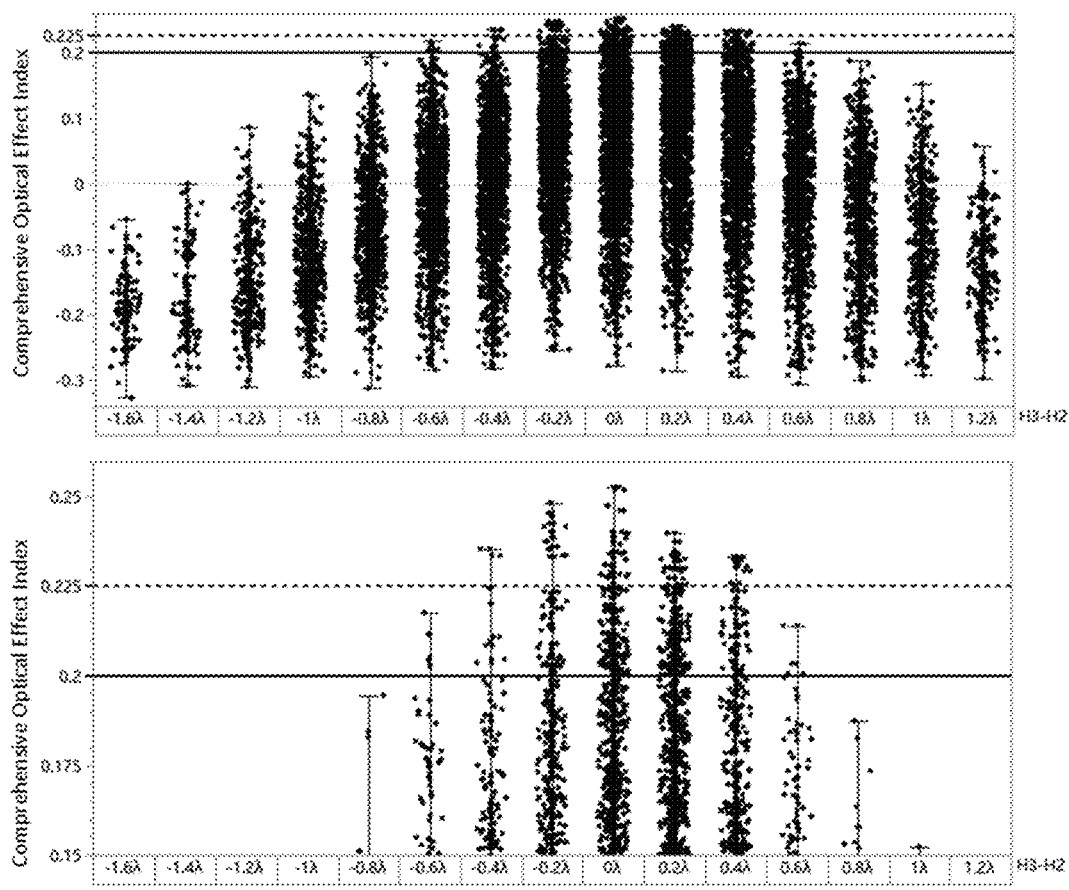
FIG. 11 is a diagram of optical effect indices changing with parameters H3-H2 obtained based on the simulation of the grating structure shown in FIG. 2.
Figure 12:
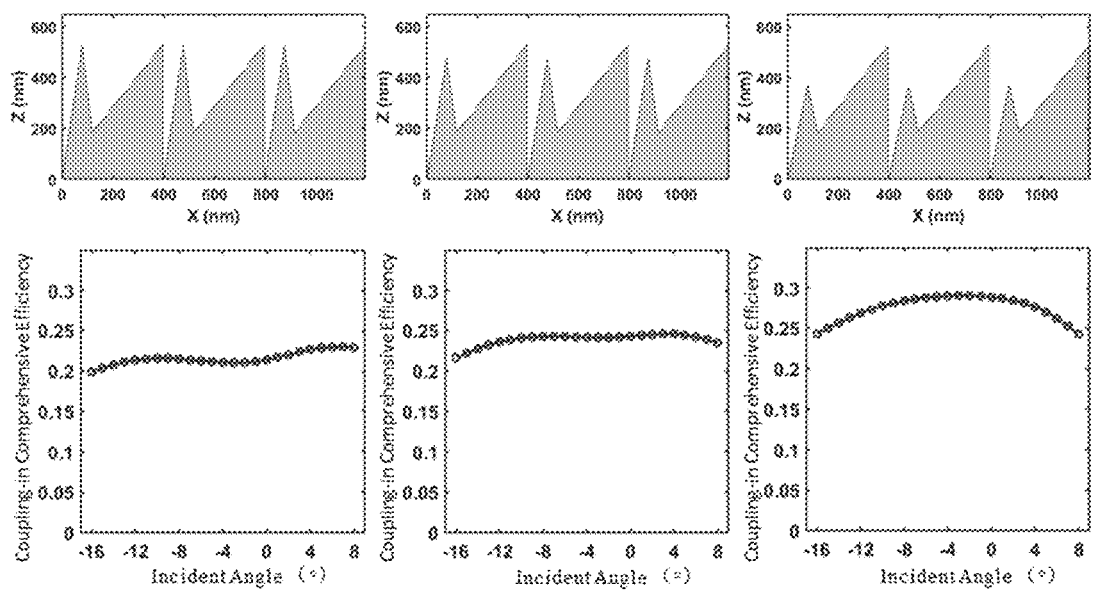
FIG. 12 shows a fifth group of examples of grating structures and curves of coupling-in comprehensive efficiencies changing with incident angles when they are used as coupling-in gratings in diffraction optical waveguides, wherein the grating structures have different parameters H3-H2.

FIG. 11 is a diagram of the optical effect indices of different grating structures in the scanning calculation examples changing with the parameters H3−H2. As shown in FIG. 11, in the grating structure 100 according to the embodiment of the present disclosure, in order to achieve the primary optical effect target fitness=0.2, advantageously $-0.6\lambda \le H3-H2 \le 0.6\lambda$, and in order to achieve the secondary optical effect target fitness=0.225, advantageous for $-0.4\lambda \le H3-H2 \le 0.4\lambda$. In order to intuitively understand the influence of parameter H3−H2 on the optical effect, FIG. 12 shows a fifth group of examples of grating structures and curves of coupling-in comprehensive efficiencies changing with incident angles when they are used as coupling-in gratings in diffraction optical waveguides, wherein the grating structures have different parameters H3−H2.

Figure 13:
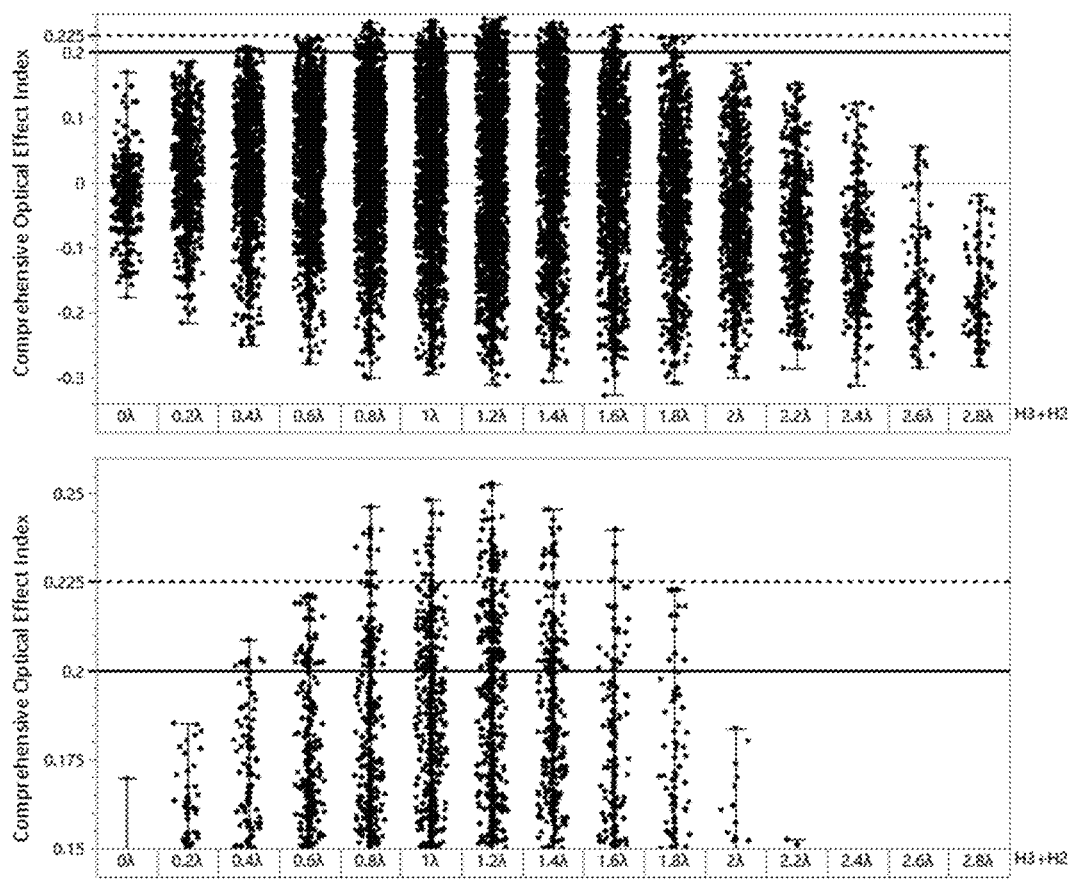
FIG. 13 is a diagram of optical effect indices changing with parameters H3+H2 obtained based on the simulation of the grating structure shown in FIG. 2.
Figure 14:
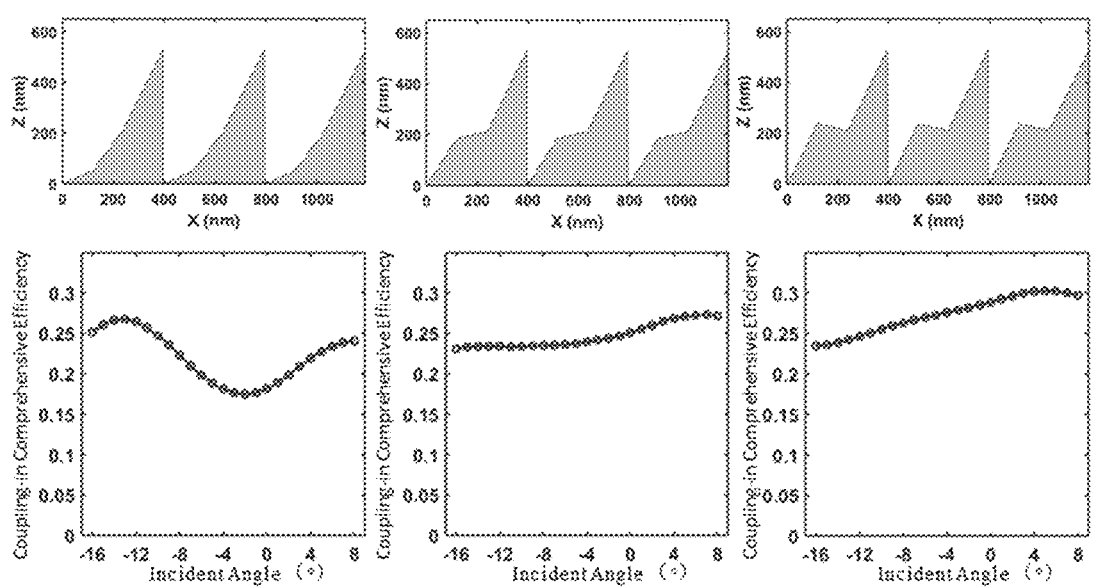
FIG. 14 shows a sixth group of examples of grating structures and curves of coupling-in comprehensive efficiencies changing with incident angles when they are used as coupling-in gratings in diffraction optical waveguides, wherein the grating structures have different parameters H3+H2.

FIG. 13 is a diagram of the optical effect indices of different grating structures in the scanning calculation examples changing with the parameters H3+H2. As shown in FIG. 13, in the grating structure 100 according to the embodiment of the present invention, in order to achieve the primary optical effect target fitness=0.2, advantageously $0.6\lambda \le H3+H2 \le 1.8\lambda$, and in order to achieve the secondary optical effect target fitness=0.225, advantageous for $0.8\lambda \le H3+H2 \le 1.6\lambda$. In order to intuitively understand the influence of parameter H3+H2 on optical effect, FIG. 14 shows a sixth group of examples of grating structures and curves of coupling-in comprehensive efficiencies changing with incident angles when they are used as coupling-in gratings in diffraction optical waveguides, wherein the grating structures have different parameters H3+H2.

Figure 15:
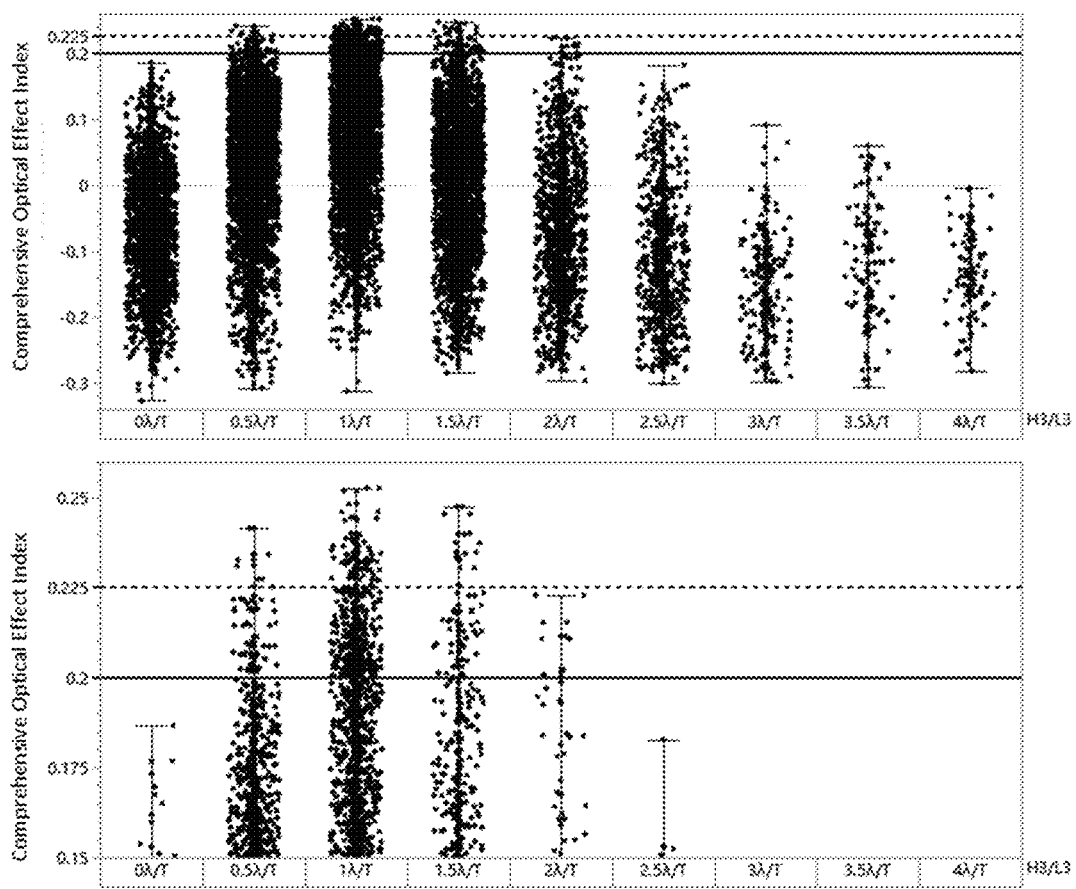
FIG. 15 is a diagram of optical effect indices changing with parameters H3/L3 obtained based on the simulation of the grating structure shown in FIG. 2.
Figure 16:
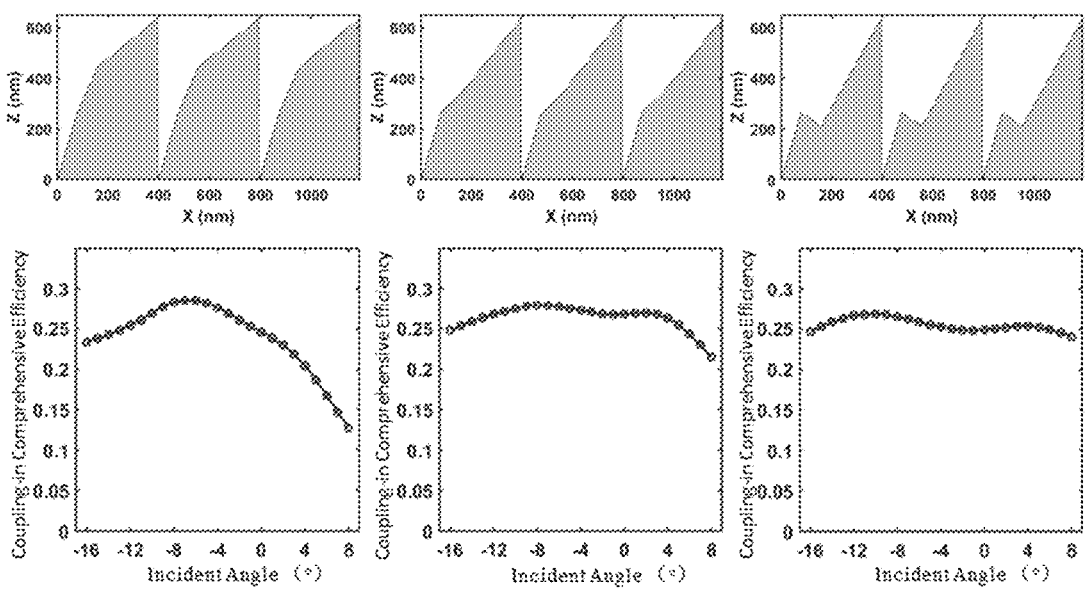
FIG. 16 shows a seventh group of examples of grating structures and curves of coupling-in comprehensive efficiencies changing with incident angles when they are used as coupling-in gratings in diffraction optical waveguides, wherein the grating structures have different parameters H3/L3.
Figure 17:
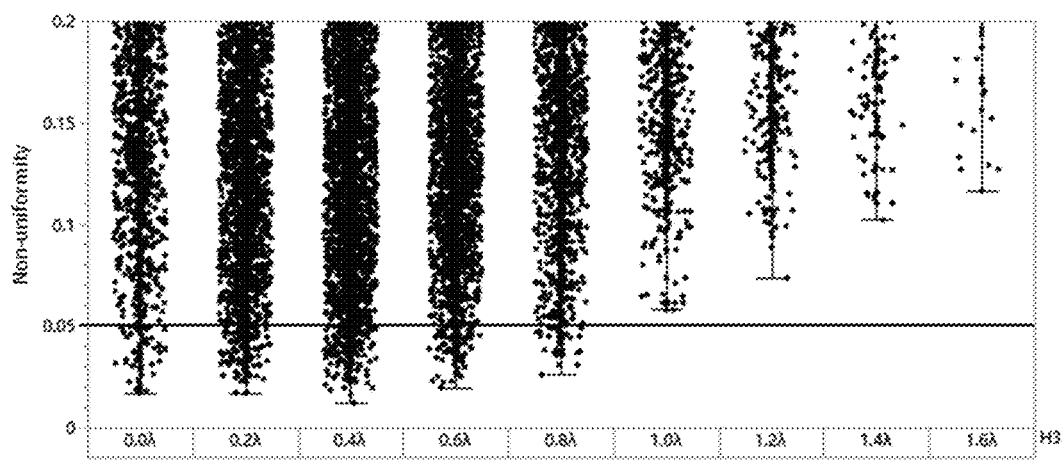
FIG. 17 is a diagram of a non-uniformity index changing with parameter H3 obtained based on the simulation of the grating structure shown in FIG. 2.
Figure 18:
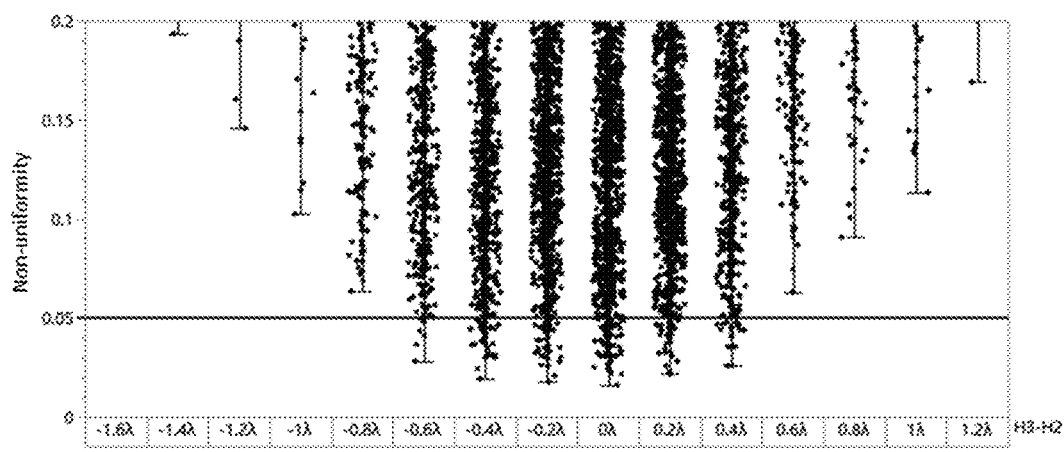
FIG. 18 is a diagram of a non-uniformity index changing with parameter H3-H2 obtained based on the simulation of the grating structure shown in FIG. 2.
Figure 19:
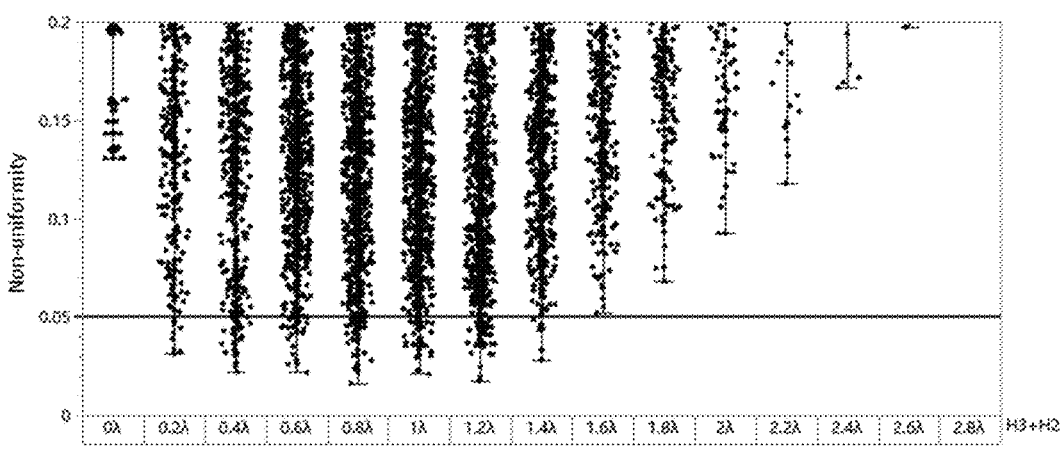
FIG. 19 is a diagram of a non-uniformity index changing with parameter H3+H2 obtained based on the simulation of the grating structure shown in FIG. 2.
Figure 20:
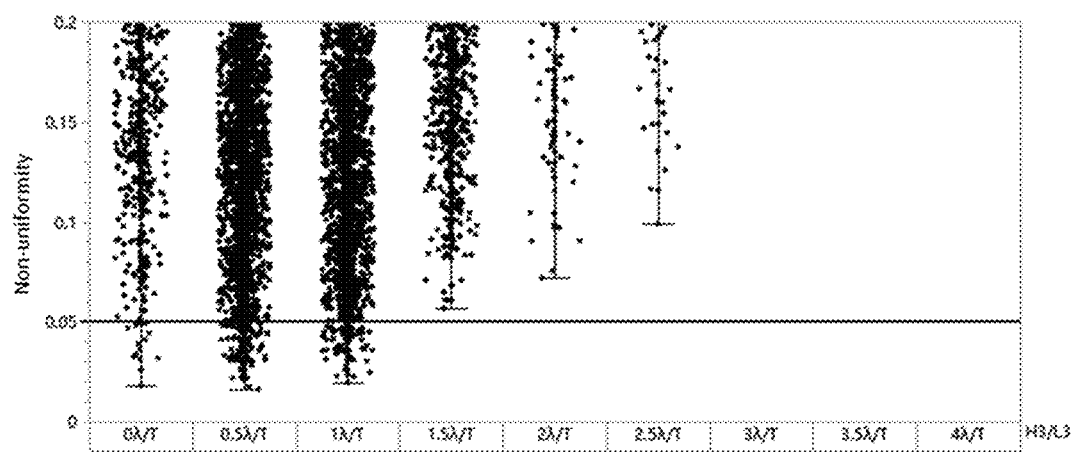
FIG. 20 is a diagram of a non-uniformity index changing with parameter H3/L3 obtained based on the simulation of the grating structure shown in FIG. 2.

FIG. 15 is a diagram of the optical effect indices of different grating structures in the scanning calculation examples changing with the parameters H3/L3. As shown in FIG. 15, in the grating structure 100 according to the embodiment of the present disclosure, in order to achieve the primary optical effect target fitness=0.2, advantageously $0.5\lambda/T \le H3/L3 \le 2\lambda/T$, and in order to achieve the secondary optical effect target fitness=0.225, advantageous for $0.5\lambda/T \le H3/L3 \le 1.5\lambda/T$. In order to intuitively understand the influence of parameter H3/L3 on optical effect, FIG. 16 shows a seventh group of examples of grating structures and curves of coupling-in comprehensive efficiencies changing with incident angles when they are used as coupling-in gratings in diffraction optical waveguides, wherein the grating structures have different parameters H3/L3.

The parameters of the first to seventh groups of examples of the grating structures are respectively shown in Table 1.1 to Table 1.7, and corresponding calculated indexes are respectively shown in Table 1.8 to Table 1.14. The units of the parameters L2, L3, and L4 in Tables 1.1-1.7 are the grating periods "T(s)", the parameter units of the parameters H2, H3, and H4 are "λ(s)", and the unit of the parameter H3/L3 is "λ/T", where λ is the working wavelength of the grating structure.

TABLE 1.1

The first group of examples

| Example | L2 | L3 | L4 | H2 | H3 |
|---|---|---|---|---|---|
| left | 0.29 | 0.51 | 0.7 | 0.56 | 0.5 |
| middle | 0.29 | 0.51 | 0.85 | 0.56 | 0.5 |
| right | 0.29 | 0.51 | 0.995 | 0.56 | 0.5 |

| Example | H4 | H3 − H2 | H3 + H2 | H3/L3 |
|---|---|---|---|---|
| left | 1.18 | −0.06 | 1.06 | 0.98 |
| middle | 1.18 | −0.06 | 1.06 | 0.98 |
| right | 1.18 | −0.06 | 1.06 | 0.98 |

TABLE 1.2

The second group of examples

| Example | L2 | L3 | L4 | H2 | H3 |
|---|---|---|---|---|---|
| left | 0.2 | 0.5 | 0.9 | 0.5 | 0.5 |
| middle | 0.2 | 0.5 | 0.9 | 0.5 | 0.5 |
| right | 0.2 | 0.5 | 0.9 | 0.5 | 0.5 |

TABLE 1.2-continued

The second group of examples

| Example | H4 | H3 − H2 | H3 + H2 | H3/L3 |
|---|---|---|---|---|
| left | 0.55 | 0 | 1 | 1 |
| middle | 0.95 | 0 | 1 | 1 |
| right | 1.2 | 0 | 1 | 1 |

TABLE 1.3

The third group of examples

| Example | L2 | L3 | L4 | H2 | H3 |
|---|---|---|---|---|---|
| left | 0.2 | 0.6 | 0.9 | 0.6 | 1.2 |
| middle | 0.2 | 0.6 | 0.9 | 0.6 | 0.85 |
| right | 0.2 | 0.6 | 0.9 | 0.6 | 0.78 |

| Example | H4 | H3 − H2 | H3 + H2 | H3/L3 |
|---|---|---|---|---|
| left | 1.4 | 0.6 | 1.8 | 2 |
| middle | 1.4 | 0.25 | 1.45 | 1.42 |
| right | 1.4 | 0.18 | 1.38 | 1.3 |

TABLE 1.4

The fourth group of examples

| Example | L2 | L3 | L4 | H2 | H3 |
|---|---|---|---|---|---|
| left | 0.2 | 0.4 | 1 | 1.1 | 0.6 |
| middle | 0.2 | 0.4 | 1 | 0.9 | 0.6 |
| right | 0.2 | 0.4 | 1 | 0.7 | 0.6 |

| Example | H4 | H3 − H2 | H3 + H2 | H3/L3 |
|---|---|---|---|---|
| left | 1.3 | −0.5 | 1.7 | 1.5 |
| middle | 1.3 | −0.3 | 1.5 | 1.5 |
| right | 1.3 | −0.1 | 1.3 | 1.5 |

TABLE 1.5

The fifth group of examples

| Example | L2 | L3 | L4 | H2 | H3 |
|---|---|---|---|---|---|
| left | 0.2 | 0.3 | 1 | 1 | 0.35 |
| middle | 0.2 | 0.3 | 1 | 0.89 | 0.35 |
| right | 0.2 | 0.3 | 1 | 0.7 | 0.35 |

| Example | H4 | H3 − H2 | H3 + H2 | H3/L3 |
|---|---|---|---|---|
| left | 1.3 | −0.65 | 1.35 | 1.17 |
| middle | 1.3 | −0.54 | 1.24 | 1.17 |
| right | 1.3 | −0.35 | 1.05 | 1.17 |

TABLE 1.6

The sixth group of examples

| Example | L2 | L3 | L4 | H2 | H3 |
|---|---|---|---|---|---|
| left | 0.3 | 0.6 | 1 | 0.1 | 0.4 |
| middle | 0.3 | 0.6 | 1 | 0.3 | 0.4 |
| right | 0.3 | 0.6 | 1 | 0.5 | 0.4 |

TABLE 1.6-continued

The sixth group of examples

| Example | H4 | H3 − H2 | H3 + H2 | H3/L3 |
|---|---|---|---|---|
| left | 1 | 0.3 | 0.5 | 0.67 |
| middle | 1 | 0.1 | 0.7 | 0.67 |
| right | 1 | −0.1 | 0.9 | 0.67 |

TABLE 1.7

The sixth group of examples

| Example | L2 | L3 | L4 | H2 | H3 |
|---|---|---|---|---|---|
| left | 0.2 | 0.4 | 1 | 0.5 | 0.84 |
| middle | 0.2 | 0.4 | 1 | 0.5 | 0.64 |
| right | 0.2 | 0.4 | 1 | 0.5 | 0.4 |

| Example | H4 | H3 − H2 | H3 + H2 | H3/L3 |
|---|---|---|---|---|
| left | 1.2 | 0.34 | 1.34 | 2.1 |
| middle | 1.2 | 0.14 | 1.14 | 1.6 |
| right | 1.2 | −0.1 | 0.9 | 1 |

TABLE 1.8

The first group of examples

| Example | eff$_{com-ave}$ | uni | fitness |
|---|---|---|---|
| left | 0.1906 | 0.124 | 0.1472 |
| middle | 0.2301 | 0.0425 | 0.2152 |
| right | 0.2814 | 0.0842 | 0.2519 |

TABLE 1.9

The second group of examples

| Example | eff$_{com-ave}$ | uni | fitness |
|---|---|---|---|
| left | 0.1069 | 0.2723 | 0.0116 |
| middle | 0.2517 | 0.1099 | 0.2133 |
| right | 0.2459 | 0.0263 | 0.2367 |

TABLE 1.10

The third group of examples

| Example | eff$_{com-ave}$ | uni | fitness |
|---|---|---|---|
| left | 0.169 | 0.5843 | −0.0355 |
| middle | 0.2441 | 0.0866 | 0.2138 |
| right | 0.2513 | 0.0693 | 0.2271 |

TABLE 1.11

The fourth group of examples

| Example | eff$_{com-ave}$ | uni | fitness |
|---|---|---|---|
| left | 0.2132 | 0.0683 | 0.1893 |
| middle | 0.2648 | 0.1333 | 0.2181 |
| right | 0.2848 | 0.1134 | 0.2452 |

TABLE 1.12

The fifth group of examples

| Example | eff$_{com-ave}$ | uni | fitness |
|---|---|---|---|
| left | 0.239 | 0.064 | 0.2166 |
| middle | 0.2515 | 0.0929 | 0.219 |
| right | 0.2749 | 0.0898 | 0.2435 |

TABLE 1.13

The sixth group of examples

| Example | eff$_{com-ave}$ | uni | fitness |
|---|---|---|---|
| left | 0.2208 | 0.2095 | 0.1475 |
| middle | 0.247 | 0.0834 | 0.2178 |
| right | 0.2736 | 0.1264 | 0.2294 |

TABLE 1.14

The seventh group of examples

| Example | eff$_{com-ave}$ | uni | fitness |
|---|---|---|---|
| left | 0.2392 | 0.383 | 0.1051 |
| middle | 0.2634 | 0.1302 | 0.2178 |
| right | 0.2546 | 0.055 | 0.2354 |

The comparison of each group of parameters and optical effect indices shown in Table 1.1 to Table 1.14 reflects the influence of different parameters on optical effects and advantageous and preferred ranges of the parameters with reference to FIGS. 4 to 16. At the same time, it can also be seen from Table 1.1 to Table 1.14 that the examples of the grating structure according to the embodiments of the present disclosure meet the primary optical effect index and the secondary optical effect index show outstanding coupling-in comprehensive efficiencies, in which the average value of the coupling-in comprehensive efficiencies eff$_{com-ave}$(s) in multiple examples exceeds the limit value (about 0.25) of the average value of the coupling-in comprehensive efficiencies of the blazed grating, and can even be as high as 0.28.

The grating structure according to the embodiment of the present disclosure can be further optimized in terms of uniformity by selecting the parameters of the cross-sectional profile of the grating line. FIG. 17 to FIG. 20 respectively show variations of the non-uniformity indices of different grating structures with parameters H3, H3−H2, H3+H2, and H3/L3 in the scanning calculation examples. The smaller the value of the non-uniformity index uni, the better. Taking the non-uniformity index uni=0.05 as an optimization target of the uniformity, it can be seen from FIG. 17 that, preferably, H3≤0.8λ, it can be seen from FIG. 18 that, preferably, H3−H2≤0.4λ, it can be seen from FIG. 19 that, preferably, H3+H2≤1.4λ, and it can be seen from FIG. 20 that, preferably, H3/L3≤λ/T. The above optimization target of the uniformity uni=0.05 is significantly better than the uniformity provided by a rectangular grating as a coupling-in grating (the index uni of the rectangular grating is above 0.3), and even for the blazed grating, this is an excellent standard of uniformity which is often difficult to achieve.

Figure 21:
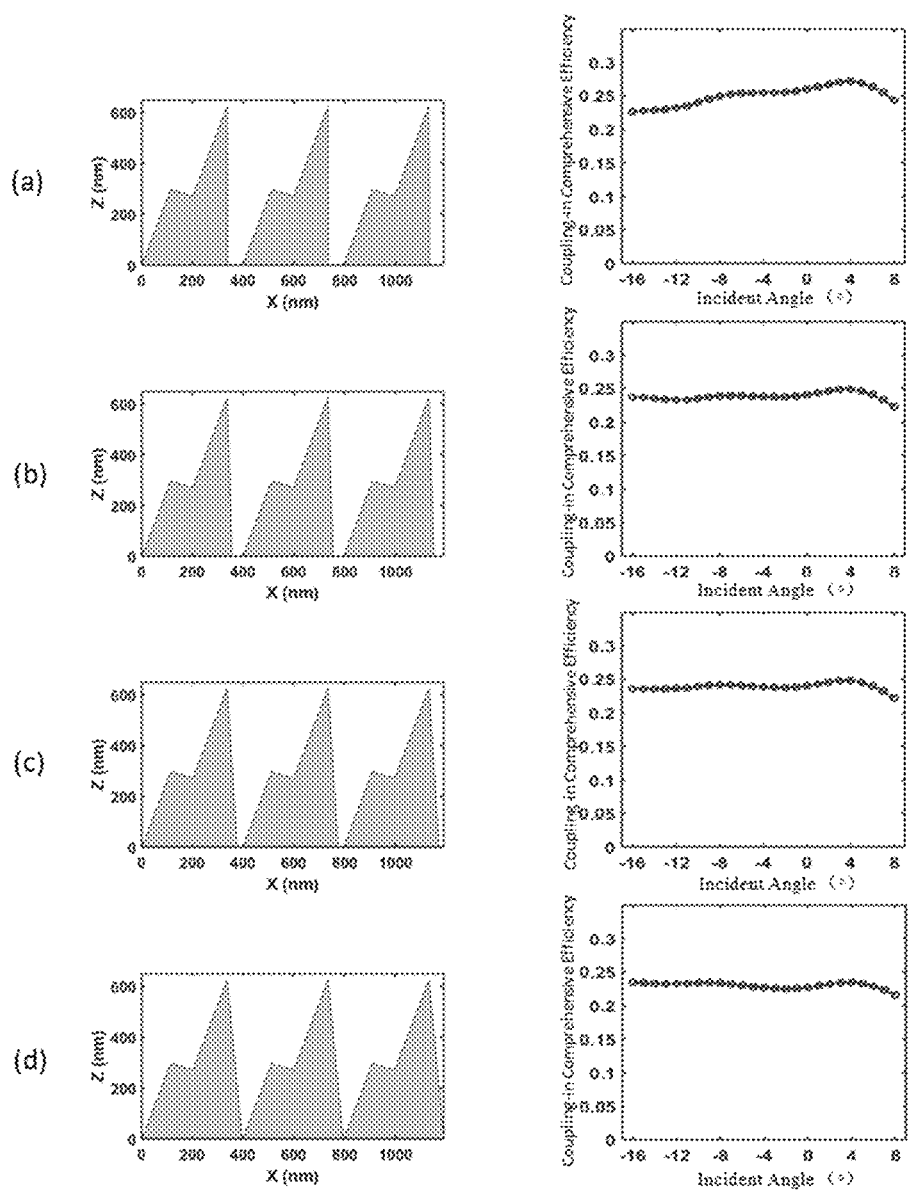
FIG. 21 is a group of examples of grating structures according to the embodiment of the present invention and curves of coupling-in comprehensive efficiencies changing with incident angles when they are used as coupling-in gratings in diffraction optical waveguides, wherein the grating structures have different parameters L5.

In the calculation examples, a parameter of the fifth feature point in the cross-sectional profile of the grating line of the grating structure is preset as L5=T. However, the grating structure 100 according to the embodiment of the present disclosure is not limited thereto, and L5 may be smaller than T. For the sake of brevity, only the eighth group of examples of the grating structure according to the embodiment of the present disclosure shown in FIG. 21 is introduced here. FIG. 21 shows the eighth group of examples of grating structures and the calculated curves of the corresponding coupling-in comprehensive efficiencies changing with incident angles. The parameters of the cross-sectional profile of the grating line in the eighth group of examples are shown in Table 2.1, and the calculated corresponding indices are shown in Table 2.2. The units of parameters L2, L3, L4, and L5 in Table 2.1 are grating line periods "T(s)", the parameter units of parameters H2, H3, and H4 are "λ(s)", the unit of parameter H3/L3 is "λ/T", where λ is the working wavelength of the grating structure.

TABLE 2.1

| Serial number | L2 | L3 | L4 | L5 | H2 |
|---|---|---|---|---|---|
| a | 0.29 | 0.51 | 0.85 | 0.85 | 0.56 |
| b | 0.29 | 0.51 | 0.85 | 0.9 | 0.56 |
| c | 0.29 | 0.51 | 0.85 | 0.95 | 0.56 |
| d | 0.29 | 0.51 | 0.85 | 1 | 0.56 |

| Serial number | H3 | H4 | H3 − H2 | H3 + H2 | H3/L3 |
|---|---|---|---|---|---|
| a | 0.5 | 1.18 | −0.06 | 1.06 | 0.98 |
| b | 0.5 | 1.18 | −0.06 | 1.06 | 0.98 |
| c | 0.5 | 1.18 | −0.06 | 1.06 | 0.98 |
| d | 0.5 | 1.18 | −0.06 | 1.06 | 0.98 |

TABLE 2.2

| Serial number | eff$_{com-ave}$ | uni | fitness |
|---|---|---|---|
| a | 0.2506 | 0.0906 | 0.2189 |
| b | 0.2385 | 0.0558 | 0.219 |
| c | 0.2392 | 0.0546 | 0.2201 |
| d | 0.2301 | 0.0425 | 0.2152 |

From Table 2.1, Table 2.2, and the eighth group example shown in FIG. 21, it can be seen that L5 has little influence on the optical effect when changing between L4 and T. Considering the influence of processing, the grating structure whose L5 is smaller than T is easier to restore a designed grating structure (i.e. a shape of a processed structure in conformity with that of a design), which is beneficial to obtain a target optical effect close to the grating design.

In addition, in the scanning calculation examples introduced above in conjunction with FIGS. 3 to 16, it is assumed that, the first to fifth feature points in the cross-sectional profile of the grating line of the grating structure 100 are sequentially connected by a straight profile line, that is, the cross-sectional profile includes four straight lines each of which is formed by connecting two adjacent feature points among the first feature point P1, the second feature point P2, the third feature point P3, the fourth feature point P4 and the fifth feature point P5. However, the grating structure 100 according to the embodiment of the present disclosure is not limited to a case where the cross-sectional profile only includes straight lines. For example, the cross-sectional profile of the grating line can include at least a curve which is formed by connecting between two adjacent feature points among the first feature point P1, the second feature point P2, the third feature point P3, the fourth feature point P4, and the fifth feature point P5. In some examples, all four profile lines can be curves.

Figure 22:
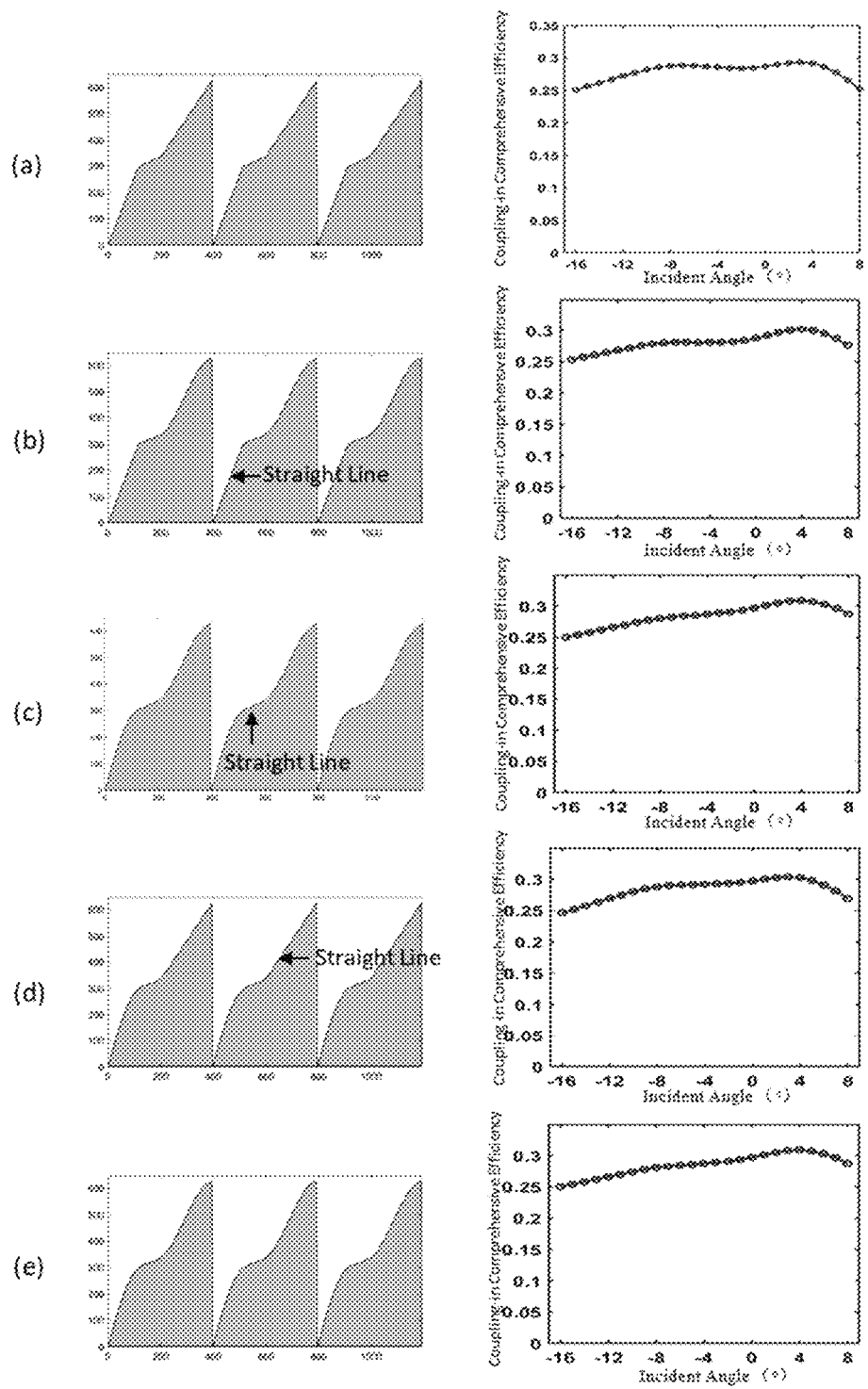
FIG. 22 is a group of examples of grating structures according to the embodiment of the present invention and curves of coupling-in comprehensive efficiencies changing with incident angles when they are used as coupling-in gratings in diffraction optical waveguides, wherein the grating structures have different straight or curved profiles.

In order to facilitate the understanding of the above situations with different profile lines and their influence on the optical effect of the grating structure 100, the ninth group of examples of the grating structure 100 according to the embodiment of the present disclosure will be introduced below with reference to FIG. 22. The left side of FIG. 22 shows examples a, b, c, d, and e in the ninth group of examples of the grating structure 100 sequentially from top to bottom, and on the right side of these grating structures, the curves of coupling-in comprehensive efficiencies changing with incident angles when they are used as coupling-in gratings in diffraction optical waveguides are shown. The parameters of each feature point of the cross-sectional profile of the grating line of the ninth group of examples are the same, as shown in Table 3. The units of parameters L2, L3, L4, and L5 in Table 3 are grating line periods "T(s)", the parameter units of parameters H2, H3, and H4 are "λ(s)", and the unit of parameter H3/L3 is "λ/T", where λ is the working wavelength of the grating structure.

TABLE 3

| L2 | L3 | L4 | L5 | H2 |
|---|---|---|---|---|
| 0.25 | 0.5 | 1 | 1 | 0.55 |
| H3 | H4 | H3 − H2 | H3 + H2 | H3/L3 |
| 0.65 | 1.18 | 0.1 | 1.2 | 1.3 |

As shown in FIG. 22, in the ninth group of examples, all profile lines in Example a are straight lines; the profile line between the first feature point P1 and the second feature point P2 in Example b is a straight line, while the others are curves; the profile line between the second feature point P2 and the third feature point P3 in Example c is a straight line, while the others are curves; the profile line between the third feature point P3 and the fourth feature point P4 in Example d is a straight line, while the others are curves; and all profile lines in Example e are curves. The curved profile lines in these examples are obtained by using a Hermite interpolation formula three times in segments (a shape preserving interpolation method).

The calculated optical effect indices for the ninth group of examples are shown in Table 4.

TABLE 4

| Serial number | eff$_{com-ave}$ | uni | fitness |
|---|---|---|---|
| a | 0.2792 | 0.0798 | 0.2519 |
| b | 0.2807 | 0.0888 | 0.2497 |
| c | 0.2847 | 0.1057 | 0.2477 |
| d | 0.2845 | 0.1039 | 0.2482 |
| e | 0.2849 | 0.1061 | 0.2478 |

Referring to FIG. 22 and Table 4, comparing examples of the grating structure 100 and variants thereof, it can be found that the values of the optical effect index fitness achieved by them are not much different, which shows that when positions of the feature points are fixed, the optimization goal can be achieved by connecting them with straight lines or curves. In addition, with the application of the curved profile, more degrees of freedom are provided for the design of the grating structure and the regulation of the optical effect.

The grating structure and diffraction optical waveguide according to the embodiments of the present disclosure can be applied to a display device. Such a display device is, for example, a near-eye display device, which includes a lens and a frame for holding the lens close to the eye, wherein the lens may include the grating structure and/or diffraction optical waveguide according to the embodiments of the present disclosure as described above. Preferably, the display device may be an augmented reality display device or a virtual reality display device.

As discussed above with reference to the illustration of the figures, the followings are provided in this application:
(1) A diffraction optical waveguide for display, comprising a waveguide substrate and a coupling-in grating arranged on the waveguide substrate, wherein
the coupling-in grating, being configured to couple a light beam into the waveguide substrate enabling the light beam to propagate within the waveguide substrate through total internal reflection, comprises a grating structure, the grating structure comprising a plurality of grating lines arranged in a plane, and the plurality of grating lines being arranged with a period of T along a first direction in the plane and extending along a second direction perpendicular to the first direction, wherein each of at least part of the plurality of grating lines has a cross-sectional profile with a narrow top and a wide bottom in a cross section perpendicular to the second direction, the cross-sectional profile comprises five feature points being sequentially along the first direction, which are a first feature point, a second feature point, a third feature point, a fourth feature point and a fifth feature point, and the feature points are the points where maximum curvatures of the cross-sectional profile are located; and
in a coordinate system with the first feature point as an origin, the first direction as a first coordinate axis L, and a direction perpendicular to the plane as a second coordinate axis H, the first feature point, the second feature point, the third feature point, the fourth feature point and the fifth feature point respectively have coordinates (0, 0), (L2, H2), (L3, H3), (L4, H4) and (L5, 0), and satisfy following relationships:

$0.2T \leq L2 \leq L3 \leq L4 \leq L5 \leq T;$ $L3 \leq 0.8T; L3-L2 \geq 0.1T; L4 \geq 0.8T;$ $0 \leq H2 \leq \lambda; 0.2\lambda \leq H3 \leq 0.6\lambda; H4 \leq 1.8\lambda;$ $\max(H2, H3) \leq H4;$ $-0.6\lambda \leq H3-H2 \leq 0.6\lambda; 0.6\lambda \leq H3+H2 \leq 1.8\lambda;$ and $0.5\lambda/T \leq H3/L3 \leq 2\lambda/T;$ where λ is a working wavelength of the grating structure.
(2) The diffraction optical waveguide of item (1), wherein $L4 \geq 0.9T;$ $0.2\lambda, H2 \leq 0.8\lambda; H3 \leq 0.8\lambda; \lambda \leq H4 \leq 1.6\lambda;$ $-0.4\lambda, H3-H2 \leq 0.4\lambda; 0.8\lambda \leq H3+H2 1.6\lambda;$ and $H3/L3 \leq 1.5)/T.$ (3) The diffraction optical waveguide of item (1) or (2), wherein $H3 \le 0.8\lambda$;

$H3-H2 \le 0.4\lambda; H3+H2 \le 1.4\lambda$; and $H3/L3 \le \lambda/T$.

(4) The diffraction optical waveguide of item (1), wherein the cross-sectional profile comprises at least a curve which is formed between two adjacent feature points among the first feature point, the second feature point, the third feature point, the fourth feature point, and the fifth feature point.

(5) The diffraction optical waveguide of item (4), wherein wherein the cross-sectional profile comprises at least a straight line which is formed between two adjacent feature points among the first feature point, the second feature point, the third feature point, the fourth feature point, and the fifth feature point.

(6) The diffraction optical waveguide of item (1), further comprising a coupling-out grating arranged on the waveguide substrate, wherein the coupling-out grating is configured to couple at least a portion of light within the waveguide substrate propagating thereinto through total internal reflection substantially along a coupling-in direction out of the waveguide substrate by diffraction, the first direction being substantially consistent with the coupling-in direction.

(7) A grating structure for the diffraction optical waveguide of item (1), comprising the plurality of grating lines arranged in a plane, the plurality of grating lines being arranged with the period of T along the first direction in the plane and extending along the second direction perpendicular to the first direction, wherein each of at least a portion of the plurality of grating lines has the cross sectional profile with the narrow top and the wide bottom in the cross section perpendicular to the second direction, the cross-sectional profile comprises five feature points being sequentially along the first direction, which are the first feature point, the second feature point, the third feature point, the fourth feature point and the fifth feature point, and the feature points are the points where the maximum curvatures of the cross-sectional profile are located; and in the coordinate system with the first feature point as the origin, the first direction as the first coordinate axis L, and the direction perpendicular to the plane as the second coordinate axis H, the first feature point, the second feature point, the third feature point, the fourth feature point and the fifth feature point respectively have coordinates (0, 0), (L2, H2), (L3, H3), (L4, H4) and (L5, 0), and satisfy the following relationships:

$0.2T \le L2 < L3 < L4 \le L5 \le T$;

$L3 \le 0.8T; L3-L2 \ge 0.1T; L4 \ge 0.8T$;

$0 \le H2 \le \lambda; 0.2\lambda \le H3 \le \lambda; 0.6\lambda \le H4 \le 1.8\lambda$;

$\max(H2,H3) \le H4$;

$-0.6\lambda \le H3-H2 \le 0.6\lambda; 0.6\lambda \le H3+H2 \le 1.8\lambda$; and $0.5\lambda/T \le H3/L3 \le 2\lambda/T$;

where λ is a working wavelength of the grating structure.

A display device comprising the diffraction optical waveguide of any one of items (1)-(6)

The display device of item (8), wherein the display device is a near-eye display device and comprises a lens and a frame for holding the lens close to the eye, the lens comprising the diffraction optical waveguide.

The display device of item (8) or (9), wherein the display device is an augmented reality display device or a virtual reality display device.

The above description is merely an illustration of the preferred embodiments of the present application and the applied technical principles. Those skilled in the art should understand that the scope of the disclosure involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. A diffraction optical waveguide for display, comprising a waveguide substrate and a coupling-in grating arranged on the waveguide substrate, wherein the coupling-in grating, being configured to couple a light beam into the waveguide substrate enabling the light beam to propagate within the waveguide substrate through total internal reflection, comprises a grating structure, the grating structure comprising a plurality of grating lines arranged in a plane, and the plurality of grating lines being arranged with a period of T along a first direction in the plane and extending along a second direction perpendicular to the first direction, wherein each of at least part of the plurality of grating lines has a cross-sectional profile with a narrow top and a wide bottom in a cross section perpendicular to the second direction, the cross-sectional profile comprises five feature points being sequentially along the first direction, which are a first feature point, a second feature point, a third feature point, a fourth feature point and a fifth feature point, and the feature points are the points where maximum curvatures of the cross-sectional profile are located; and in a coordinate system with the first feature point as an origin, the first direction as a first coordinate axis L, and a direction perpendicular to the plane as a second coordinate axis H, the first feature point, the second feature point, the third feature point, the fourth feature point and the fifth feature point respectively have coordinates (0, 0), (L2, H2), (L3, H3), (L4, H4) and (L5, 0), and satisfy following relationships:

$0.2T \le L2 \le L3 \le L4 \le L5 \le T$;

$L3 \le 0.8T; L3-L2 \ge 0.1T; L4 \ge 0.8T$;

$0 \le H2 \le \lambda; 0.2\lambda \le H3 \le \lambda; 0.6\lambda \le H4 \le 1.8\lambda$;

$\max(H2,H3) \le H4$;

$-0.6\lambda \le H3-H2 \le 0.6\lambda; 0.6\lambda \le H3+H2 \le 1.8\lambda$; and $0.5\lambda/T \le H3/L3 \le 2\lambda/T$;

where λ is a working wavelength of the grating structure.

2. The diffraction optical waveguide of claim 1, wherein $L4 \ge 0.9T$;

$0.2\lambda \le H2 \le 0.8\lambda; H3 \le 0.8\lambda; \lambda \le H4 \le 1.6\lambda$;

$-0.4\lambda \leq H3-H2 \leq 0.4\lambda; 0.8\lambda \leq H3+H2 \leq 1.6\lambda;$ and $H3/L3 \leq 1.5\lambda/T.$ 3. The diffraction optical waveguide of claim 2, wherein $H3 \leq 0.8\lambda;$ $H3-H2 \leq 0.4\lambda; H3+H2 \leq 1.4\lambda;$ and $H3/L3 \leq \lambda/T.$ 4. The diffraction optical waveguide of claim 1, wherein $H3 \leq 0.8\lambda;$ $H3-H2 \leq 0.4\lambda; H3+H2 \leq 1.4\lambda;$ and $H3/L3 \leq \lambda/T.$ 5. The diffraction optical waveguide of claim 1, wherein the cross-sectional profile comprises at least a curve which is formed between two adjacent feature points among the first feature point, the second feature point, the third feature point, the fourth feature point, and the fifth feature point.

6. The diffraction optical waveguide of claim 5, wherein the cross-sectional profile comprises at least a straight line which is formed between two adjacent feature points among the first feature point, the second feature point, the third feature point, the fourth feature point, and the fifth feature point.

7. The diffraction optical waveguide of claim 1, further comprising a coupling-out grating arranged on the waveguide substrate, wherein the coupling-out grating is configured to couple at least a portion of light within the waveguide substrate propagating thereinto through total internal reflection substantially along a coupling-in direction out of the waveguide substrate by diffraction, the first direction being substantially consistent with the coupling-in direction.

8. A grating structure for the diffraction optical waveguide of claim 1, comprising the plurality of grating lines arranged in a plane, the plurality of grating lines being arranged with the period of T along the first direction in the plane and extending along the second direction perpendicular to the first direction, wherein each of at least a portion of the plurality of grating lines has the cross sectional profile with the narrow top and the wide bottom in the cross section perpendicular to the second direction, the cross-sectional profile comprises five feature points being sequentially along the first direction, which are the first feature point, the second feature point, the third feature point, the fourth feature point and the fifth feature point, and the feature points are the points where the maximum curvatures of the cross-sectional profile are located; and in the coordinate system with the first feature point as the origin, the first direction as the first coordinate axis L, and the direction perpendicular to the plane as the second coordinate axis H, the first feature point, the second feature point, the third feature point, the fourth feature point and the fifth feature point respectively have coordinates (0, 0), (L2, H2), (L3, H3), (L4, H4) and (L5, 0), and satisfy the following relationships:

$0.2T \leq L2 \leq L3 \leq L4 \leq L5 \leq T;$ $L3 \leq 0.8T; L3-L2 \geq 0.1T; L4 \geq 0.8T;$ $0 \leq H2 \leq \lambda; 0.2\lambda \leq H3 \leq \lambda; 0.6\lambda \leq H4 \leq 1.8\lambda;$ $\max(H2,H3) \leq H4;$ $-0.6\lambda \leq H3-H2 \leq 0.6\lambda; 0.6\lambda \leq H3+H2 \leq 1.8\lambda;$ and $0.5\lambda/T \leq H3/L3 \leq 2\lambda/T;$ where $\lambda$ is a working wavelength of the grating structure.

9. A display device comprising a diffraction optical waveguide of claim 1.

10. The display device of claim 9, wherein the display device is a near-eye display device and comprises a lens and a frame for holding the lens close to the eye, the lens comprising the diffraction optical waveguide.

11. The display device of claim 10, wherein the display device is an augmented reality display device or a virtual reality display device.

12. The display device of claim 9, wherein the display device is an augmented reality display device or a virtual reality display device.

* * * * *